(12) United States Patent
Niwa et al.

(10) Patent No.: US 6,932,402 B2
(45) Date of Patent: Aug. 23, 2005

(54) CONSOLE BOX

(75) Inventors: Kenji Niwa, Aichi-ken (JP); Akira Yamauchi, Aichi-ken (JP); Shigeru Yabuya, Aichi-ken (JP); Etsuo Ozawa, Aichi-ken (JP); Takahiko Sato, Aichi-ken (JP); Hiroki Imamura, Aichi-ken (JP); Yuji Shimizu, Nisshin (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 68 days.

(21) Appl. No.: 10/616,306

(22) Filed: Jul. 10, 2003

(65) Prior Publication Data

US 2004/0080173 A1 Apr. 29, 2004

(30) Foreign Application Priority Data

Jul. 11, 2002 (JP) ........................................ 2002-202546
Dec. 26, 2002 (JP) ........................................ 2002-378632
Jun. 19, 2003 (JP) ........................................ 2003-175500

(51) Int. Cl.$^7$ ............................................... B60R 7/00
(52) U.S. Cl. .................. 296/24.34; 296/37.8; 296/1.09
(58) Field of Search .............................. 296/24.3, 24.33, 296/24.34, 37.1, 37.5, 37.8, 37.9, 37.14, 1.07, 1.09; 220/262, 263, 315; 224/275, 42.32

(56) References Cited

U.S. PATENT DOCUMENTS 3,351,404 A * 11/1967 Blake .......................... 312/246
4,934,750 A * 6/1990 Eichler et al. ............... 296/37.8
6,129,237 A * 10/2000 Miyahara ...................... 220/812
6,419,314 B1 * 7/2002 Scheerhorn .............. 297/188.19
6,499,785 B2 * 12/2002 Eguchi ......................... 296/37.8
6,634,690 B2 * 10/2003 Schaal ......................... 296/37.1
6,702,352 B2 * 3/2004 Nakanishi et al. .......... 296/37.8
2001/0020620 A1 * 9/2001 Katagiri et al. ............ 220/345.2
2003/0155786 A1 * 8/2003 Kim et al. .................. 296/24.1

FOREIGN PATENT DOCUMENTS

| JP | U-4-133951 | | 12/1992 | |
|----|-----------|---|---------|---|
| JP | 405193417 | * | 8/1993 | ............. 296/37.14 |
| JP | U-5-95349 | | 12/1993 | |
| JP | 405338496 | * | 12/1993 | ............. 296/37.14 |
| JP | 405338497 | * | 12/1993 | ............. 296/37.14 |
| JP | 406099775 | * | 4/1994 | ............. 296/37.14 |
| JP | 406107073 | * | 4/1994 | ............. 296/37.14 |
| JP | 406115401 | * | 4/1994 | ............. 296/37.14 |
| JP | A-9-193952 | | 7/1997 | |
| JP | A-9-295542 | | 11/1997 | |
| JP | A-2000-103289 | | 4/2000 | |
| JP | A-2000-159026 | | 6/2000 | |

* cited by examiner

Primary Examiner—D. Glenn Dayoan
Assistant Examiner—H. Gutman
(74) Attorney, Agent, or Firm—Posz & Bethards, PLC

(57) ABSTRACT

A console box of the present invention has a box main body, a pair of sidewalls, and an armrest. The box main body is located between the sidewalls, and the armrest is located above the box main body. Each sidewall has a guide groove extending in the moving direction of the vehicle. The armrest has a pair of engaging pins. Each engaging pin is engaged with and slides along one of the guide grooves. Thus, the armrest smoothly slides along the moving direction of the vehicle.

21 Claims, 31 Drawing Sheets

CONSOLE BOX

BACKGROUND OF THE INVENTION

The present invention relates to a console box located between the driver's seat and a front passenger seat in a vehicle such as an automobile.

The following patent and utility model publications disclose typical console boxes. Japanese Laid-Open Utility Model Publication No. 5-95349 discloses as console box with an armrest that also functions as a lid. The armrest is attached to a box main body with a four-bar linkage to cover the upper opening. Japanese Laid-Open Patent Publication No. 2000-103289 and No. 2000-159026 disclose console boxes each having an armrest that also functions as a lid. The armrest is slidably attached to a box main body with a pair of guide rails to cover the upper opening.

Japanese Laid-Open Utility Model Publication No. 4-133951 discloses a console box with a curved top surface. Specifically, the top surface has an arcuate cross-section along a plane perpendicular to the moving direction of the vehicle. An opening is formed in the top surface. The console box has a lid that is moved to left and right to open the opening. Japanese Laid-Open Patent Publication No. 9-193952 discloses a console box with a shutter-like lid. The lid is formed of a flexible sheet and covers an opening formed in the upper surface of the box main body.

The structures of the above publications have the following drawbacks.

In the console box of the Utility Model Publication No. 5-95349, the armrest is moved vertically with the four bar linkage to open or close the opening. At this time, the armrest can rattle due to insufficient rigidity, which degrades quality of the console box. Further, when the armrest is at the lifted position, the four bar linkage is exposed, which degrades the appearance and may cause foreign matter to be caught between the linkage and the armrest.

In the console box of the Patent Publication No. 2000-103289, the armrest is engaged with the guide rails from the outside in the lateral direction. Therefore, the armrest is likely to rattle in the lateral direction when being slid. To cope with these drawbacks, the Patent Publication No. 2000-159026 discloses a structure with a pair of rod-like guide rails provided on a lid main body. The console box of the publication has a sliding body that is separately formed from the lid main body and functions as an armrest. The sliding body is engaged with the guide rails with leaf springs. This structure absorbs dimensional errors of the guide rails and thus permits the armrest to slide smoothly. However, the structure is complicated and increases the cost. Such problems are solved if the lid main body and the sliding body are integrated and the integrated body is supported by the box main body. In this case, however, two rails must be arranged at the upper opening of the box main body. This degrades the usability.

In the console box of Utility Model Publication No. 4-133951, the opening of the box main body and the lid are formed arcuate. This structure not only limits the shapes of the storage chamber and the lid, but also limits the entire shape of the console box. The lid cannot function as an armrest. The lid of Patent Publication No. 9-193952 is deformed and has no rigidity. The lid therefore cannot function as an armrest.

SUMMARY OF THE INVENTION

Accordingly, it is an objective of the present invention to provide a console box with an armrest that is moved smoothly.

To achieve the foregoing and other objectives and in accordance with the purpose of the present invention, a console box mounted on a vehicle having a box main body, first and second sidewalls, and an armrest is provided. The first and second sidewalls are arranged in a lateral direction of the vehicle and face each other. The box main body is located between the first and second sidewalls. Each of the first and second sidewalls has a guide portion extending in a moving direction of the vehicle. The guide portions are formed in facing surfaces of the first and second sidewalls. The armrest is located above the box main body and between the first and second sidewalls. The armrest has a first surface facing the first sidewall and a second surface facing the second sidewall. An engaging portion is provided on each of the first and second surfaces. Each engaging portion is slidably engaged with the corresponding guide portion such that the armrest is supported between the first and second sidewalls and slidable in the moving direction of the vehicle.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 29(*b*) is a cross-sectional view taken along line C—C of FIG. 29(*a*);

DETAILED DESCRIPTION OF THE PREFERRED EMBODIMENTS

A first embodiment of the present invention will now be described with reference to FIGS. 1 to 6.

Figure 1:
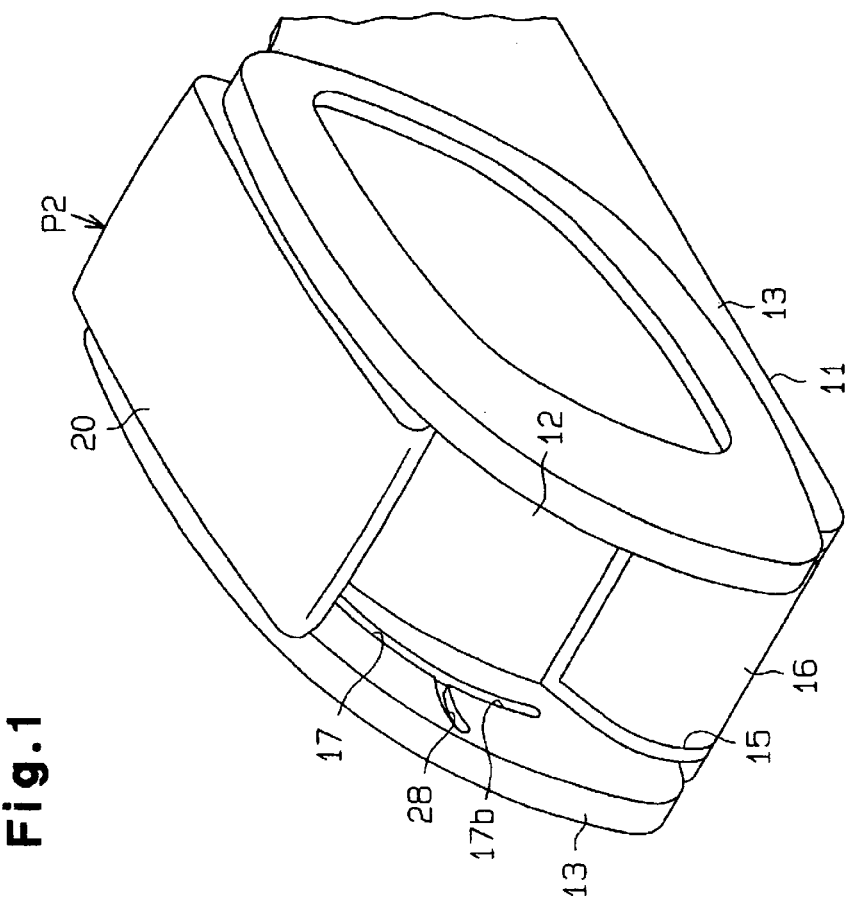
FIG. 1 is a perspective view illustrating a console box according to a first embodiment.
Figure 2:
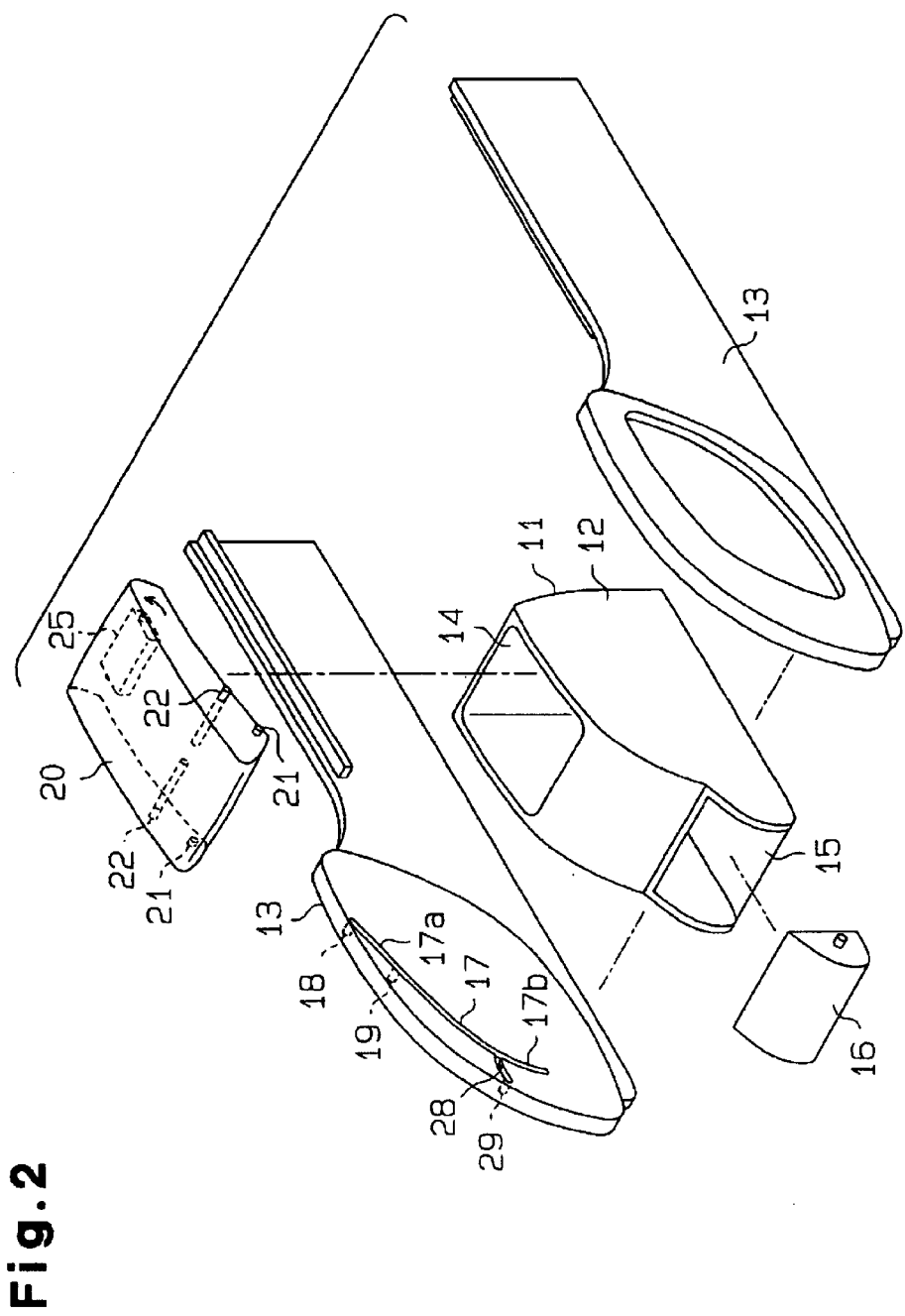
FIG. 2 is an exploded perspective view illustrating the console box shown in FIG. 1.
Figure 3:
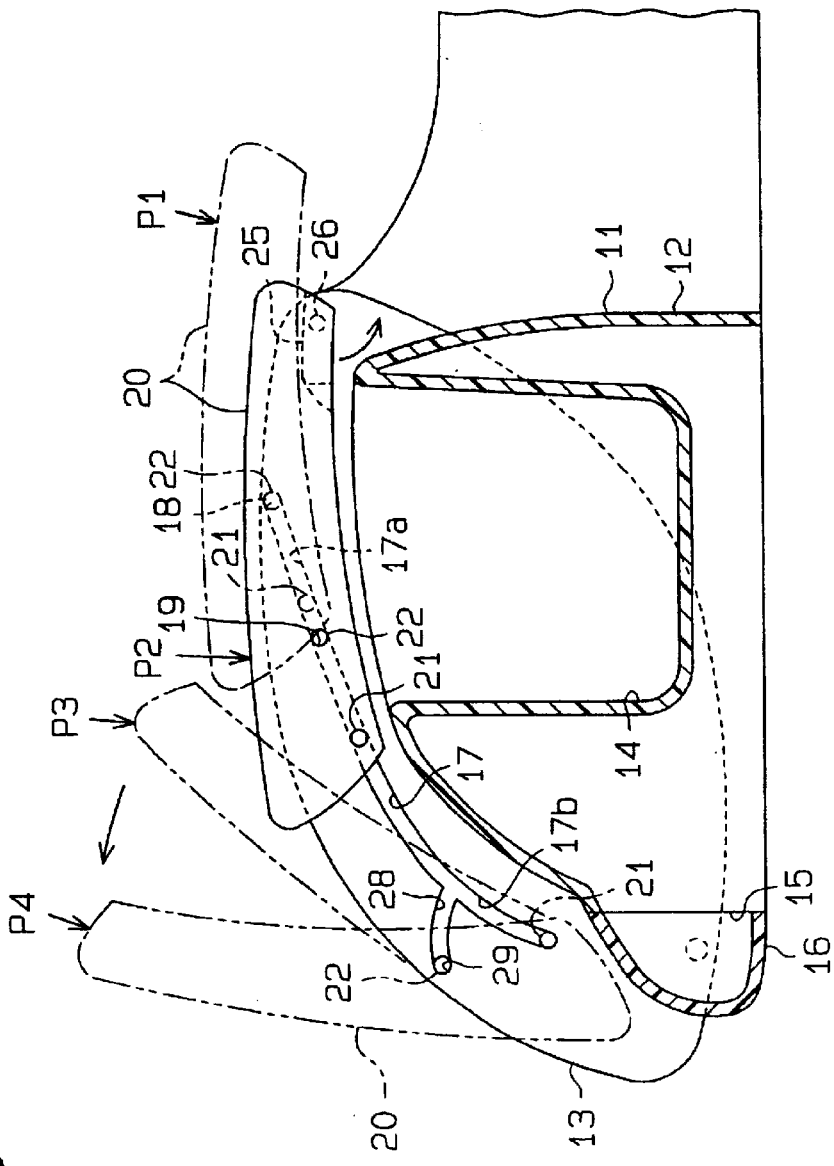
FIG. 3 is a vertical cross-sectional view illustrating the console box shown in FIG. 1.

A console box 11 illustrated in FIGS. 1 to 3 is located between the driver's seat and the front passenger seat of a vehicle. The console box 11 includes a box main body 12, which is made of a synthetic resin. Left and right sidewalls 13 made of a synthetic resin are attached to the left side and the right side of the box main body 12 with fasteners such as pins (not shown). A storage chamber 14 having an upper opening is formed in a center portion of the box main body 12. A pocket 15 is formed in a rear portion of the box main body 12. A resin ashtray 16 or a case for small articles is rotatably attached to the pocket 15.

As shown in FIGS. 1 to 4, a guide groove 17 is formed in the inner surface of each sidewall 13. The guide grooves 17 function as guide portions. Each guide groove 17 has a front inclined section 17*a* and a substantially arcuate rear inclined section 17*b*. The front inclined section 17*a* is inclined upward toward the front of the vehicle. The rear inclined section 17*b* is inclined downward toward the rear of the vehicle. First and second positioning recesses 18, 19 are formed in the bottom of each guide groove 17. The first positioning recess 18 is located at the front end of the front inclined section 17*a*, and the second positioning recess 19 is located in a center section of the front inclined section 17*a*.

As shown in FIGS. 1 to 3, an auxiliary guide groove 28 is formed in each guide groove 17. The auxiliary guide groove 28 branches from the upper side of the rear inclined section 17*b* and extends rearward. The auxiliary guide grooves 28 function as auxiliary guide portions. Each auxiliary guide groove 28 is formed arcuate about the lower end of the corresponding rear inclined section 17*b*. A third positioning recess 29, which is similar to the first and second positioning recesses 18, 19, is formed at the distal end of each auxiliary guide groove 28.

A resin armrest 20 is provided above the box main body 12 of the console box 11 and is located between the sidewalls 13. The armrest 20 functions as a lid for selectively opening and closing the upper opening of the storage chamber 14. Left and right fixed pins 21 protrude laterally from side sections near the rear end. The fixed pins 21 function as engaging portions. The armrest 20 further has retractable pins 22 in a center section at the sides. The retractable pins 22 function as engaging portions and positioning members. Each retractable pin 22 is biased outward by a spring 23. The springs 23 function as biasing member.

The pins 21, 22 are slidably engaged with the guide grooves 17. This permits the armrest 20 to move along the guide grooves 17. When the armrest 20 is moved along the front inclined sections 17*a* of the guide grooves 17, the armrest 20 is moved frontward or rearward above the storage chamber 14. At this time, the retractable pins 22 are engaged with the first positioning recesses 18 or the second positioning recesses 19. Accordingly, the armrest 20 is held at a front closing position P1 or a rear closing position P2 and closes the upper opening of the storage chamber 14.

Since the front inclined sections 17*a* are inclined upward towards the front, the armrest 20 is ascended as it is moved from the rear closing position P2 to the front closing position P1. Also, since the fixed pins 21 are located at lower positions than the retractable pins 22, the armrest 20 is substantially held horizontal both at the front closing position P1 and the rear closing position P2.

When the armrest 20 is moved rearward along the rear inclined sections 17*b* of the guide grooves 17, the fixed pins 21 are engaged with the rear ends of the rear inclined sections 17*b* as shown in FIG. 3. Accordingly, the armrest 20 is at a rear end position P3. In this case, since the rear inclined sections 17*b* are arcuate with the rear ends curved downward, the rear end of the armrest 20 is gradually descended, and opens the upper opening of the storage chamber 14.

When the armrest 20 that is at the rear end position P3 is pivoted rearward about the fixed pins 21, the retractable pins 22 are guided into the auxiliary guide grooves 28. Accordingly, the armrest 20 is moved from a position above the storage chamber 14 to a retreat position P4. At the retreat position P4, the armrest 20 stands upright and completely opens the upper opening of the storage chamber 14. In the upright state, the retractable pins 22 are engaged with the third positioning recesses 29. This holds the armrest 20 at the retreat position P4.

Figure 4:
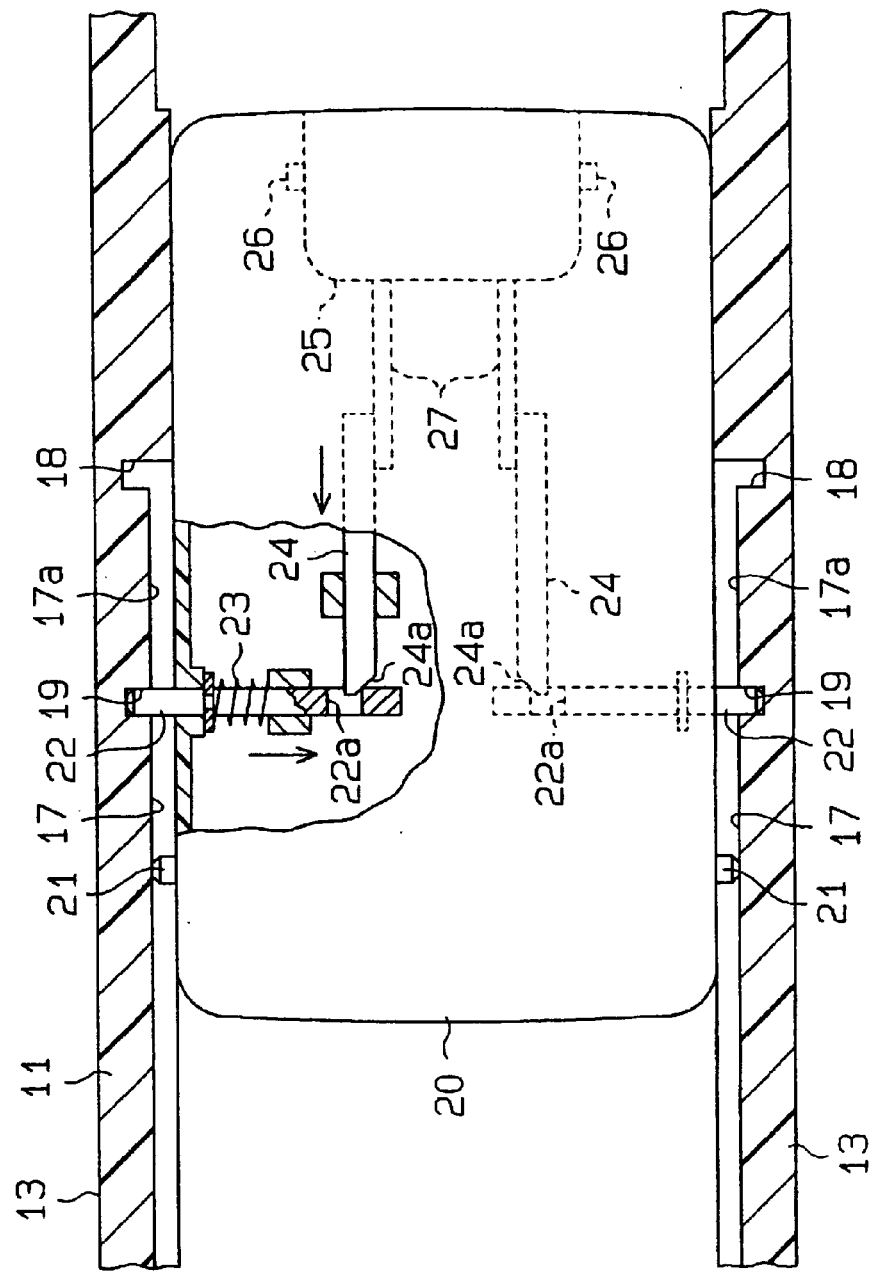
FIG. 4 is a horizontal cross-sectional view illustrating the console box shown in FIG. 1.
Figure 5:
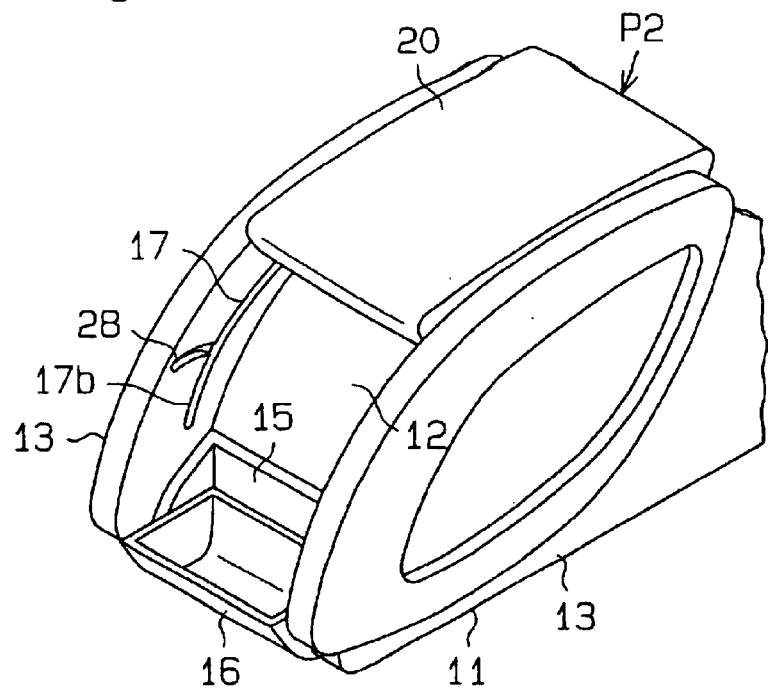
FIG. 5 is a perspective view illustrating the console box shown in FIG. 1, in which an armrest that also functions as a lid is at a closing position.

As shown in FIGS. 2 and 4, a pair of moving members, which are release rods 24, are provided in the armrest 20. Each release rod 24 corresponds to one of the retractable pins 22, and is movable in a direction perpendicular to the moving direction of the retractable pins 22. Each retractable pin 22 has an engaging hole 22a. An inclined cam surface 24a is formed at the distal end of each release rod 24. The inclined cam surface 24a of each release rod 24 is engaged with the engaging hole 22a of the corresponding retractable pin 22. A lever 25 is pivotally supported by a front lower part of the armrest 20 with shafts 26. The lever 25 is connected to the release rods 24 with links 27. When pivoted in a direction indicated by an arrow in FIGS. 2 and 3, the lever 25 pushes the rods 24 rearward with the links 27. Then, engagement between the cam surfaces 24a and the engaging holes 22a moves the retractable pins 22 inward of the armrest 20, which disengages the retractable pins 22 from the positioning recesses 18, 19 or 29.

The operations of the console box 11, which is constructed as above, will hereafter be described.

FIG. 1 illustrates a state in which the armrest 20 is at the rear closing position P2. In this state, the retractable pins 22 are engaged with the second positioning recesses 19 due to the force of the springs 23, which holds the armrest 20 at the rear closing position P2. In this state, if a passenger intends to move the armrest 20 frontward in accordance with a frontward displacement of a seat, the passenger pivots the lever 25 in a direction indicated by the arrow of FIG. 3. This moves the release rods 24 rearward with the links 27. Accordingly, engagement between the cam surfaces 24a and the engaging holes 22a releases the retractable pins 22 from the recesses 19 against the force of the springs 23, which releases the armrest 20.

Thereafter, when the armrest 20 is moved frontward, the engaging pins 21, 22 are moved along the front inclined sections 17a of the guide grooves 17. At this time, since the armrest 20 is held by the sidewalls 13, the armrest 20 does not rattle. When the armrest 20 is moved to the front end, the retractable pins 22 are engaged with the first positioning recesses 18 by the force of the springs 23. The armrest 20 is thus held at the first closing position P1 shown in FIGS. 3 and 5. In this case, since the front inclined sections 17a are inclined upward towards the front, the armrest 20 is ascended as it is moved from the rear closing position P2 to the front closing position P1. Therefore, the present invention is favorably applied to a case where a seat is ascended as it is moved frontward.

When the armrest 20 is at the front closing position P1 or the rear closing positions P2, if the passenger intends to put articles in or take out articles from the storage chamber 14 of the box main body 12, the passenger needs to pivot the lever 25 to release the armrest 20. Thereafter, when the armrest 20 is moved rearward, the engaging pins 21, 22 are moved along the rear inclined sections 17b of the guide grooves 17 until the fixed pins 21 reach the lower ends of the rear inclined sections 17b. Accordingly, the armrest 20 is at the rear end position P3 as shown in FIG. 3.

Figure 6:
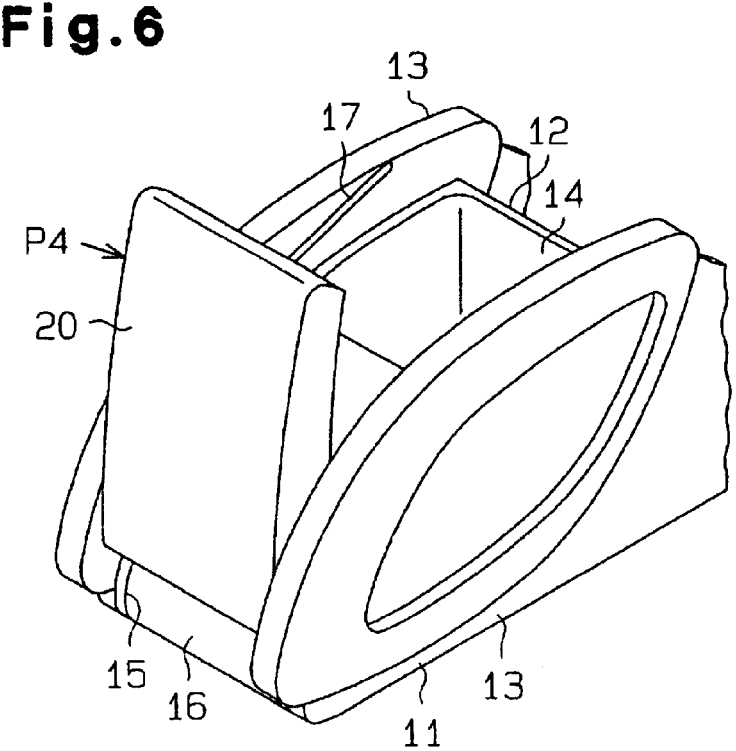
FIG. 6 is a perspective view illustrating the console box shown in FIG. 1, in which the lid-armrest is at a retreat position.

In this state, if the armrest 20 is pivoted rearward about the fixed pins 21, the retractable pins 22 are guided into the auxiliary guide grooves 28. Accordingly, the armrest 20 is moved rearward from a position above the storage chamber 14 to a retreat position P4 as shown in FIGS. 3 and 6. At the retreat position P4, the armrest 20 stands upright and opens the upper opening of the storage chamber 14. Then, engagement of the retractable pins 22 with the third positioning recesses 29 holds the armrest 20 upright at the retreat position P4. Accordingly, the upper opening of the storage chamber 14 is widely open, and the armrest 20 does not hinder the passenger from putting articles in or taking articles out of the storage chamber 14.

When the armrest 20 is moved from the retreat position P4 to the front closing position P1 or to the rear closing position P2, the lever 25 needs to be manipulated as in the above described manner to release the armrest 20. In this state, the armrest 20 is moved in the reverse direction from the previous manipulation. That is, the armrest 20 is pivoted frontward along the auxiliary guide groove 28. Then, the armrest 20 is moved frontward along the rear inclined sections 17b and the front inclined sections 17a of the guide grooves 17. Accordingly, the retractable pins 22 are engaged with the first positioning recesses 18 or the second positioning recesses 19, and the armrest 20 is held at the front closing position P1 or the rear closing position P2.

This embodiment has the following advantages.

(1) The console box 11 has the sidewalls 13 that are located at the sides of the box main body 12 and face each other. The guide grooves 17 are formed in the inner surfaces of the sidewalls 13 and extend along the moving direction of the vehicle. The engaging pins 21, 22 protrude from the sides of the armrest 20. Engagement of the pins 21, 22 with the guide grooves 17 permits the armrest 20 to be movably supported between the sidewalls 13. Therefore, the armrest 20 is stably moved along the guide grooves 17 without rattling above the box main body 12 while being held between the sidewalls 13. This adds to a luxurious feel of use.

Further, since the guide grooves 17 are away from the upper opening of the storage chamber 14, articles are easily put in or take out of the storage chamber 14. This improves the ease-of-use.

(2) The recesses 18, 19 are formed at the predetermined positions in the guide grooves 17. The retractable pins 22 are supported at the sides of the armrest 20 to be movable along the axial direction. The retractable pins 22 are biased by the springs 23 in directions to be engaged with the positioning recesses 18, 19. Therefore, the retractable pins 22 are engaged with the positioning recesses 18, 19. This permits the armrest 20 to be firmly held at the predetermined positions. The armrest 20 therefore functions reliably.

(3) The guide grooves 17 are inclined to ascend frontward so that the armrest 20 is raised as it is moved frontward. Therefore, in a case where the seat is raised as it is moved frontward, the height of the armrest 20 is appropriately changed in accordance with the position of the seat.

(4) The armrest 20 functions as a lid to open and close the upper opening of the storage chamber 14 of the box main body 12. The auxiliary guide grooves 28 for moving the armrest 20 to the retreat position P4 branch from the guide grooves 17. When the armrest 20 is moved rearward and the engaging pins 22 are guided into the auxiliary guide grooves 28, the armrest 20 is moved from a position above the storage chamber 14 to the retreat position P4 and is held upright. Accordingly, the upper opening of the storage chamber 14 is widely opened. Therefore, the armrest 20 is easily and stably moved. Also, when the armrest 20 is at the retreat position P4, articles are easily put in or taken out of the storage chamber 14.

A second embodiment of the present invention will now be described. The differences from the first embodiment will mainly be discussed.

Figure 7:
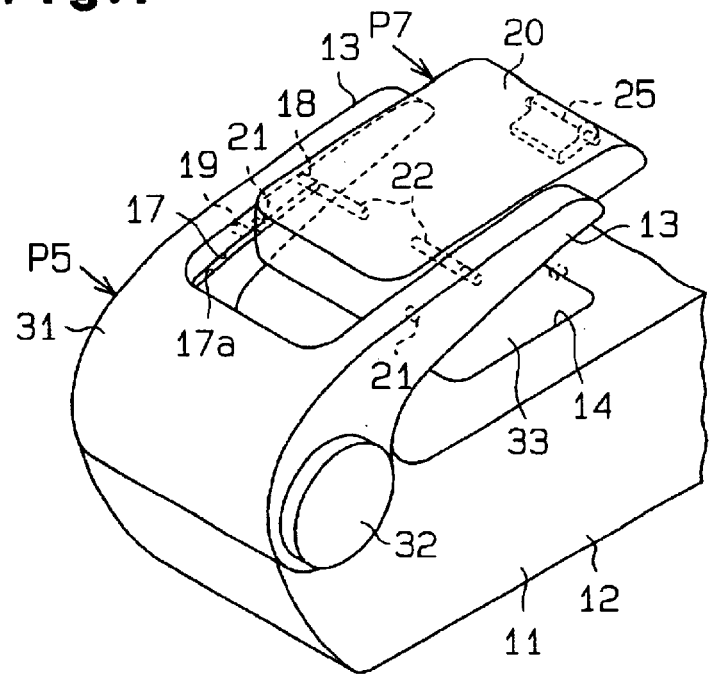
FIG. 7 is a perspective view illustrating a console box according to a second embodiment.
Figure 8:
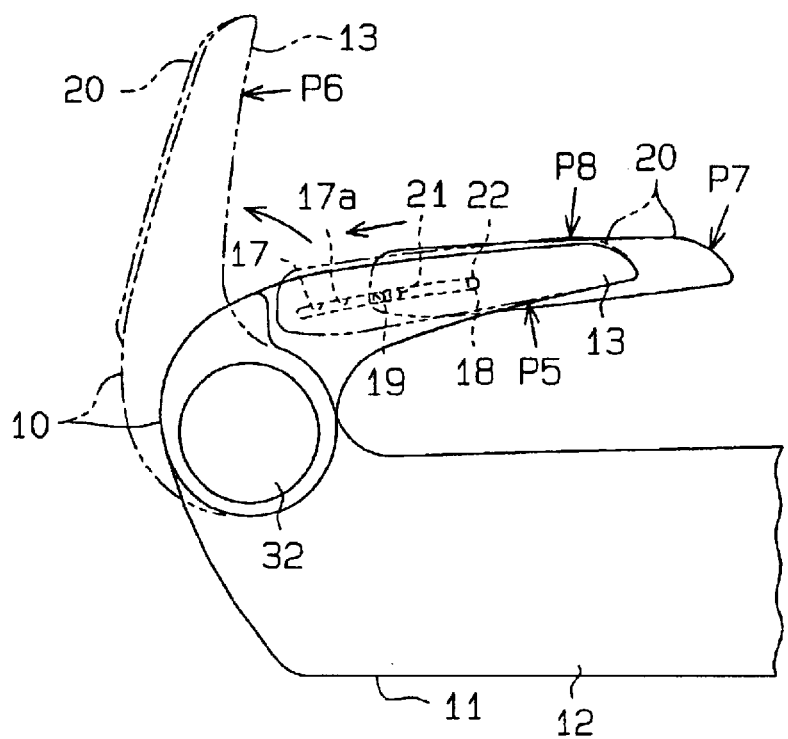
FIG. 8 is a side view illustrating the console box shown in FIG. 7.
Figure 9:
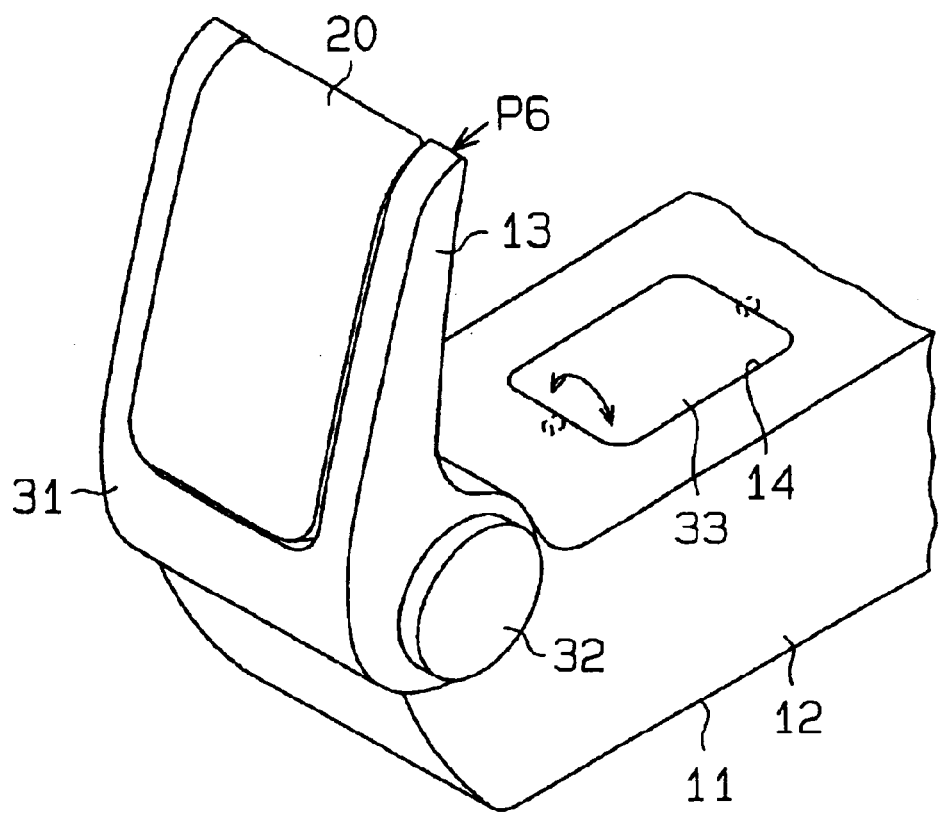
FIG. 9 is a perspective view illustrating the console box shown in FIG. 7, in which the armrest is at an upright position.

FIGS. 7 to 9 illustrate a console box 11 according to the second embodiment. The console box 11 of the second embodiment has a pivot arm 31 at the rear end. The pivot arm 31 is supported with a support shaft 32 to be pivotable between a horizontal position P5 shown in FIG. 7 and an upright position P6 shown in FIG. 9. Sidewalls 13 protrude from the pivot arm 31. A guide groove 17 is formed in the inner surface of each sidewall 13. Each guide groove 17 is inclined to ascend frontward. First and second positioning recesses 18, 19 are formed in the bottom of each guide groove 17. The first positioning recess 18 is located at the front end of the inclined section 17a, and the second positioning recess 19 is located in a center section of the inclined section 17a.

An armrest 20 is held between the sidewalls 13 of the pivot arm 31. The armrest 20 is provided with fixed pins 21 and retractable pins 22, which are similar to those in the first embodiment. The engaging pins 21, 22 are engaged with the guide grooves 17 so that the armrest 20 is moved frontward and rearward. In the second embodiment, a lid 33 is pivotally provided over as storage chamber 14 of box main body 12. When the pivot arm 31 is at the horizontal position P5, the armrest 20 is located above the storage chamber 14. Therefore, the armrest 20 of the second embodiment does not function as a lid.

When the armrest 20 is moved frontward or rearward with the pivot arm 31 at the horizontal position P5, the retractable pins 22 are engaged with the first positioning recesses 18 or the second positioning recesses 19. The engagement allows the armrest 20 to be held at a front position P7 or a rear position P8. If the pivot arm 31 is pivoted to an upright position P6 when the armrest 20 is at the rear position P8, the armrest 20 is moved rearward away from a position above the storage chamber 14 as shown in FIGS. 8 and 9.

In addition to the advantages (1) through (3) of the first embodiment, the second embodiment provides the following advantages.

(5) The pivot arm 31 having the sidewalls 13 is pivotally supported by the box main body 12. The armrest 20 is movably supported by the sidewalls 13. When the pivot arm 31 is pivoted to the horizontal position P5, the armrest 20 is above the storage chamber 14 of the box main body 12. If the pivot arm 31 is pivoted to the upright position P6 after the armrest 20 is moved rearward, the armrest 20 is moved away from the position above the storage chamber 14. Therefore, when the pivot arm 31 is at the horizontal position P5, the armrest 20 can be used for the original purpose. When the pivot arm 31 is at the upright position P6, the armrest 20 does not hinder articles from being put in or taken out of the storage chamber 14.

Figure 10:
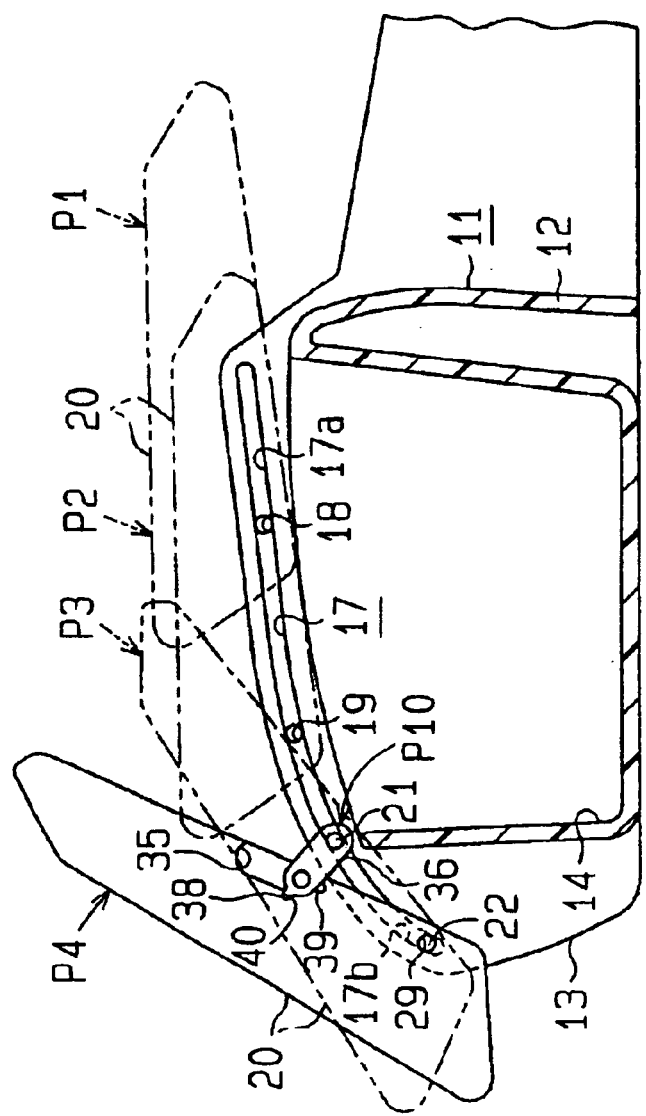
FIG. 10 is a vertical cross-sectional view illustrating a console box according to a third embodiment.
Figure 11:
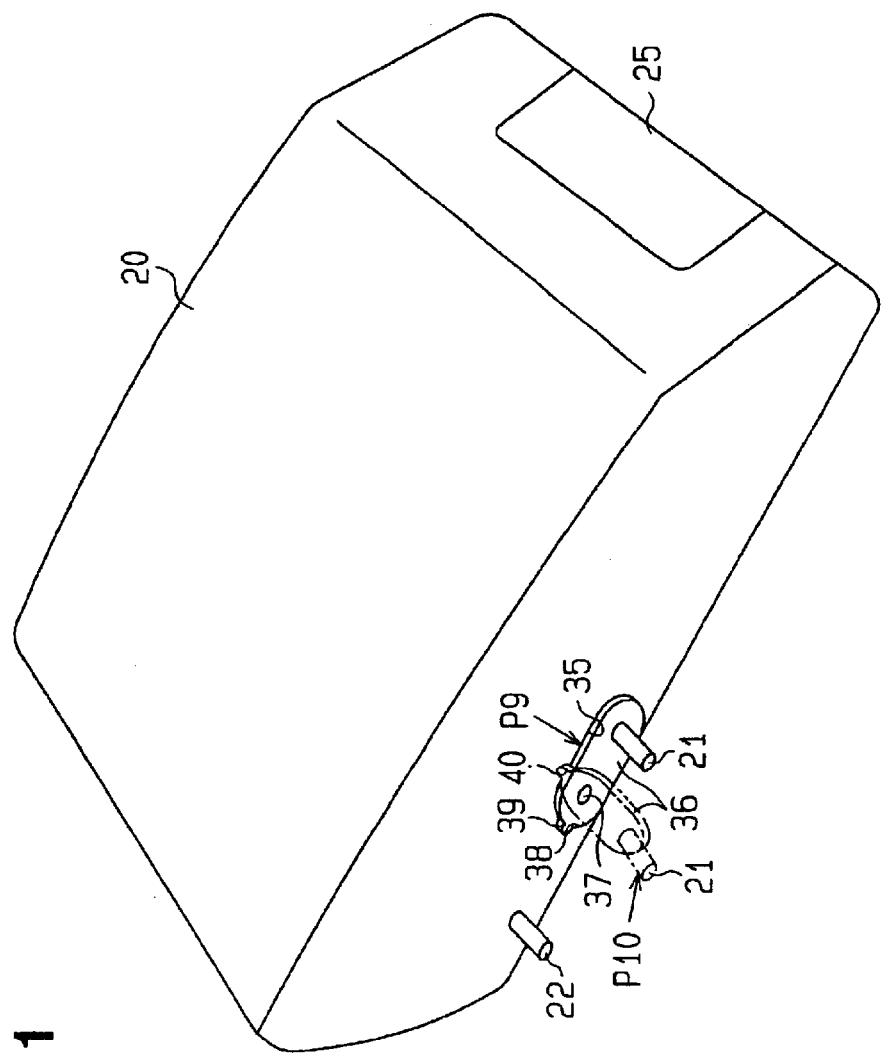
FIG. 11 is a perspective view illustrating the armrest of the console box shown in FIG. 10.

A third embodiment of the present invention will now be described with reference to FIGS. 10 and 11. The differences from the first embodiment will mainly be discussed.

An armrest 20 according to the third embodiment has retractable pins 22, which are similar to the retractable pins 22 of the first embodiment. As shown in FIGS. 10 and 11, the retractable pins 22 are located at a rear part of the sides of the armrest 20. The retractable pins 22 are engaged with first to third positioning recesses 18, 19, 29 formed in predetermined positions of guide grooves 17 of sidewalls 13. Accordingly, the armrest 20 is held at a front closing position P1, a rear closing position P2, or a rear end position P3. If a lever 25 is pivoted when the armrest 20 is in any of the positions P1, P2, and P3, the retractable pins 22 are disengaged from the first, second or third positioning recesses 18, 19, 29 in the same manner as in the first embodiment. Accordingly, the armrest 20 is released.

A socket 35 is formed in a center section of each side of the armrest 20. An arm member 36 is pivotally connected to the socket 35 with a shaft 37. An engaging pin 21 protrudes from the outer side of a distal section of each arm member 36. An engaging projection 38 protrudes from the circumference of the distal section of each arm member 36. A pair of engaging recesses 39,40, is formed in the inner circumference of the socket 35. The engaging projection 38 and engaging recesses 39,40 function as positioning mechanism. The engaging projections 38 are elastically engaged with the engaging recesses 39 or the engaging recesses 40, so that the arm members 36 are in a retracted positions in the sockets 35 or in upright positions where the arm members 36 project downward from the socket 35. In other words, the engaging projections 38 are engaged with the engaging recesses 39 or the engaging recesses 40, so that the arm members 36 are at a positions where the distance between the armrest 20 and the engaging pin 21 is substantially maximum or a positions where the distance between the armrest 20 and the engaging pin 21 is substantially maximum. Accordingly, the arm members 36 are positioned at a first pivot position P9 along the sides of the armrest 20 and a second pivot position P10 where the arm members 36 project from the armrest 20.

When the arm members 36 are at the first pivot positions P9, pivoting the armrest 20 rearward about the retractable pins 22 after moving the armrest 20 to the rear position P3 moves the arm members 36 from the first pivot position P9 to the second pivot positions P10. This causes the arm members 36 to protrude from the armrest 20 and to be diagonally engaged with the guide grooves 17 of the sidewalls 13. Accordingly, the armrest 20 is held at an upright retreat position P4.

When moving the armrest 20 from the retreat position P4 to the front closing position P1 or to the rear closing position P2, the engaging pins 21, which are at the second pivot positions P10, are moved frontward along the guide grooves 17. Accordingly, the arm members 36 are moved from the second pivot positions P10 to the first pivot positions P9, and the armrest 20 is pivoted from the retreat position P4 to the rear position P3. In this state, the lever 25 is pivoted to disengage the retractable pins 22 from the third positioning recesses 29. Then, the armrest 20 is moved forward along the guide grooves 17.

In addition to the advantages (1) through (3) of the first embodiment, the third embodiment provides the following advantages.

(6) The arm members 36 are pivotally supported at both sides of the armrest 20, and the engaging pins 21 protrude from distal portions of the holders 36. Accordingly, positioning mechanisms, which includes the engaging projection 38 and the engaging recesses 39, 40, permits the arm members 36 to be positioned at the first pivot positions P9 along the sides of the armrest 20 and the second pivot positions P10, where the arm members 36 project from the armrest 20.

Therefore, no branches need to add to the guide grooves 17. Thus, the size of the console box 11 is decreased without reducing the accommodation space of the storage chamber 14 of the box main body 12. The armrest 20 is held upright by pivoting the arm members 36 to the second positions P10. This permits articles to be easily taken out of or put in the storage chamber 14.

A fourth embodiment of the present invention will now be described. The differences from the first embodiment will mainly be discussed.

An armrest 20 according to the fourth embodiment is illustrated in FIGS. 12 to 18. The armrest 20 has fixed pins 21, which are similar to the fixed pins 21 of the first embodiment, and cylindrical pins 42. The fixed pins 21 are located at a rear part of the sides of the armrest 20. The cylindrical pins 42 project from center sections of the sides of the armrest 20. The fixed pins 21 and the cylindrical pins 42 are engaged with the guide grooves 17 formed in the inner surface of the sidewalls 13. Accordingly, the armrest 20 is movably held between the sidewalls 13. A retractable pin 22 is retractably supported by each cylindrical pin 42. The retractable pins 22 are engaged with any one of the first to third positioning recesses 18, 19, 29. Accordingly, the armrest 20 is positioned at one of the front closing position P1, the rear closing position P2, and the rear end position P3.

A guide recess 43 is formed in the inner surface of each sidewall 13. A guide surface 43a is formed at the lower side of each guide recess 43. Each guide surface 43a extends parallel to the corresponding guide groove 17. A semicircular recess 43b is formed at the rear end of each guide surface 43a. A shutter guide groove 44 is formed in the inner surface of each guide recess 43. Each shutter guide groove 44 extends along the corresponding guide groove 17. A substantially U-shaped sliding plate 45 is slidably engaged with the guide surfaces 43a of the guide recesses 43. A shutter 46 is attached to the rear end of the sliding plate 45. The engaging pins 47, 48 protrude from the sides of the sliding plate 45. Engagement of the pins 47, 48 with the shutter guide grooves 44 permits the shutter 46 to be movably supported between the sidewalls 13.

Figure 13:
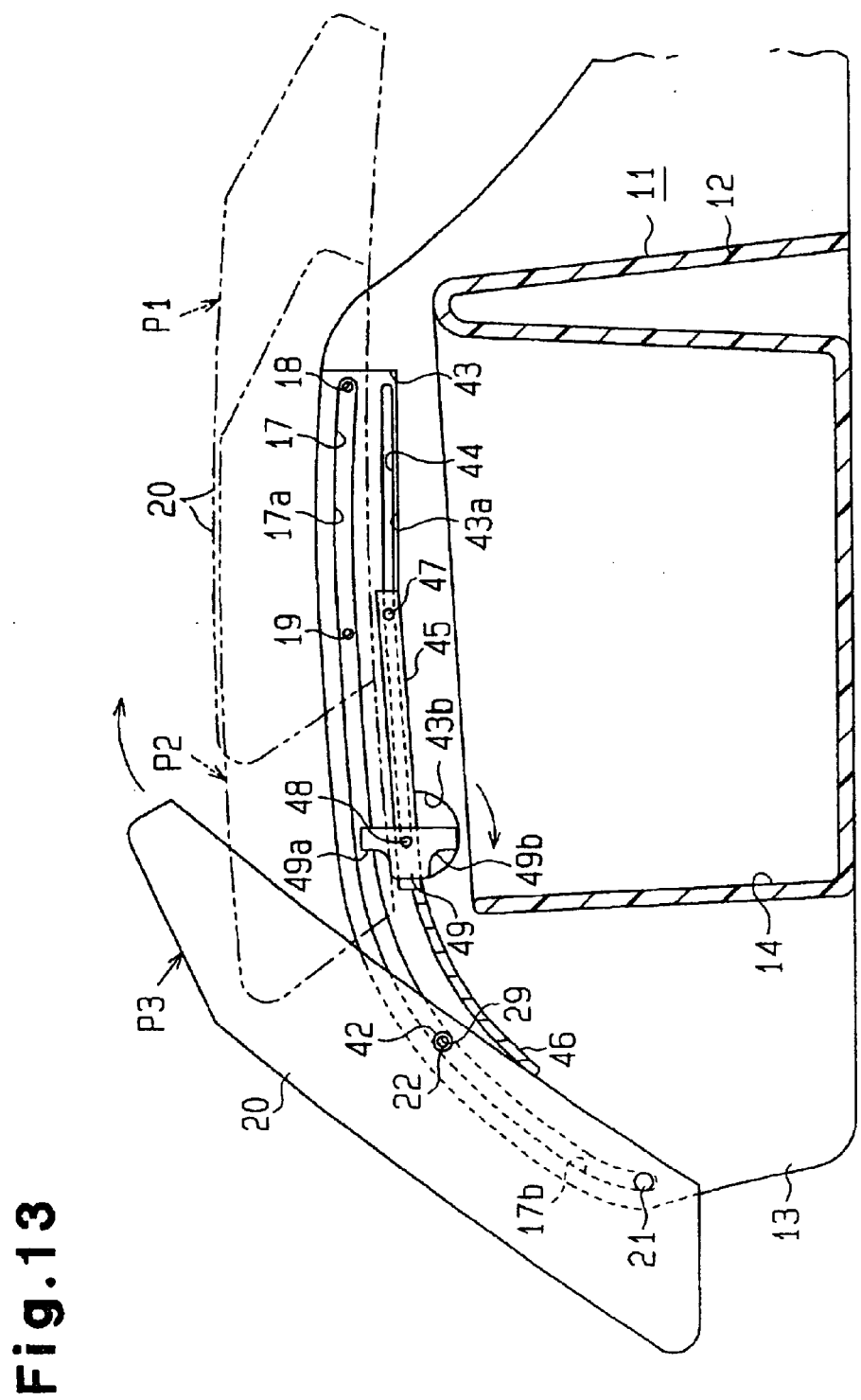
FIG. 13 is a vertical cross-sectional view illustrating the console box shown in FIG. 12, in which the armrest is at a rear end position.
Figure 14:
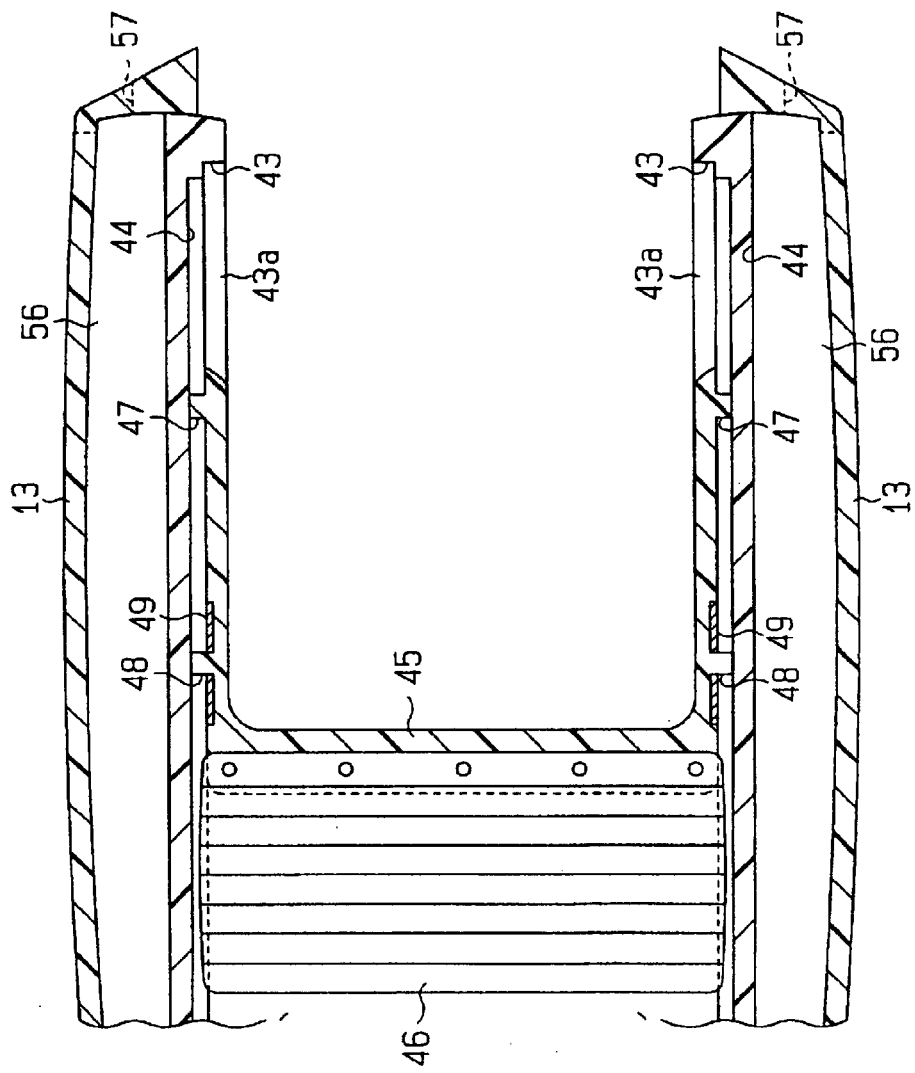
FIG. 14 is a horizontal cross-sectional view illustrating the shutter portion of the console box shown in FIG. 12.

A pivot plate 49 is pivotally supported by each engaging pin 48 at the rear section of the sliding plate 45. First and second engaging portions 49a, 49b are formed in each pivot plate 49. The first and second engaging portions 49a, 49b can be engaged with the engaging pins 21, 42. When the armrest 20 is at the rear end position P3 as shown in FIG. 13, the pivot plates 49 are at the upright positions in the semicircular recesses 43b of the guide recess 43. At this time, the shutter 46 is at a retreat position away from the upper opening of the storage chamber 14 of the box main body 12.

Figure 17:
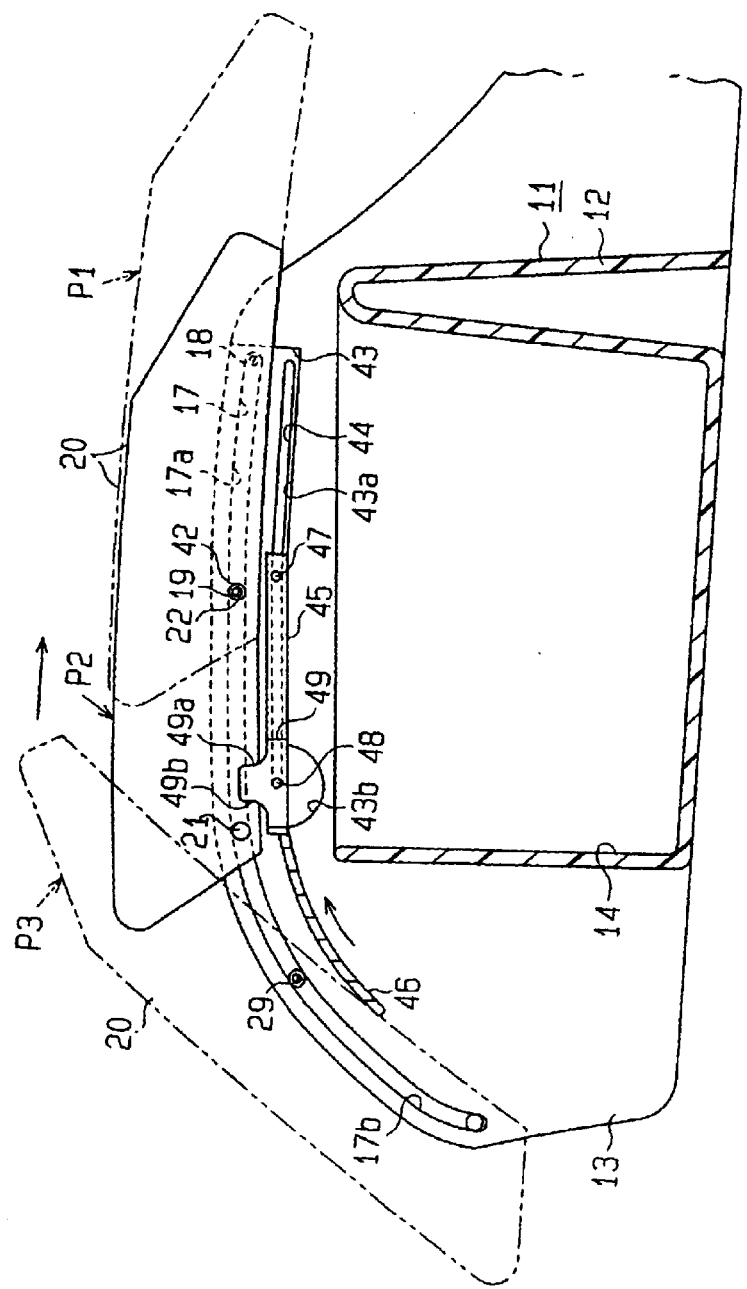
FIG. 17 is a vertical cross-sectional view illustrating the console box shown in FIG. 12, in which the armrest is at a rear closing position.

In this state, if the armrest 20 is moved from the rear end position P3 to the rear closing position P2, the cylindrical pins 42 are engaged with the first engaging portions 49a of the pivot plates 49, which rotates the pivot plate 49 clockwise by ninety degrees. Accordingly, as shown in FIG. 17, the pivot plates 49 are disengaged from the semicircular recesses 43b of the guide recesses 43. The distal ends of the pivot plates 49 are engaged with the shutter guide grooves 44 formed in a front section of the semicircular recesses 43b.

Thereafter, when the armrest 20 is moved from the rear closing position P2 to the front closing position P1, the fixed pins 21 are engaged with the second engaging portions 49b of the pivot plates 49. The pivot plates 49 then move the sliding plate 45 frontward. Accordingly, the shutter 46 is moved along the shutter guide grooves 44 to a position to cover the rear part of the upper opening of the storage chamber 14. Therefore, even if the storage chamber 14 is large and the upper opening is wide, the rear part of the upper opening is covered by the shutter 46 when the armrest 20 is moved to the front closing position P1. Thus, the rear part of the storage chamber 14 is not opened, and the interior of the storage chamber 14 is not exposed.

Figure 18:
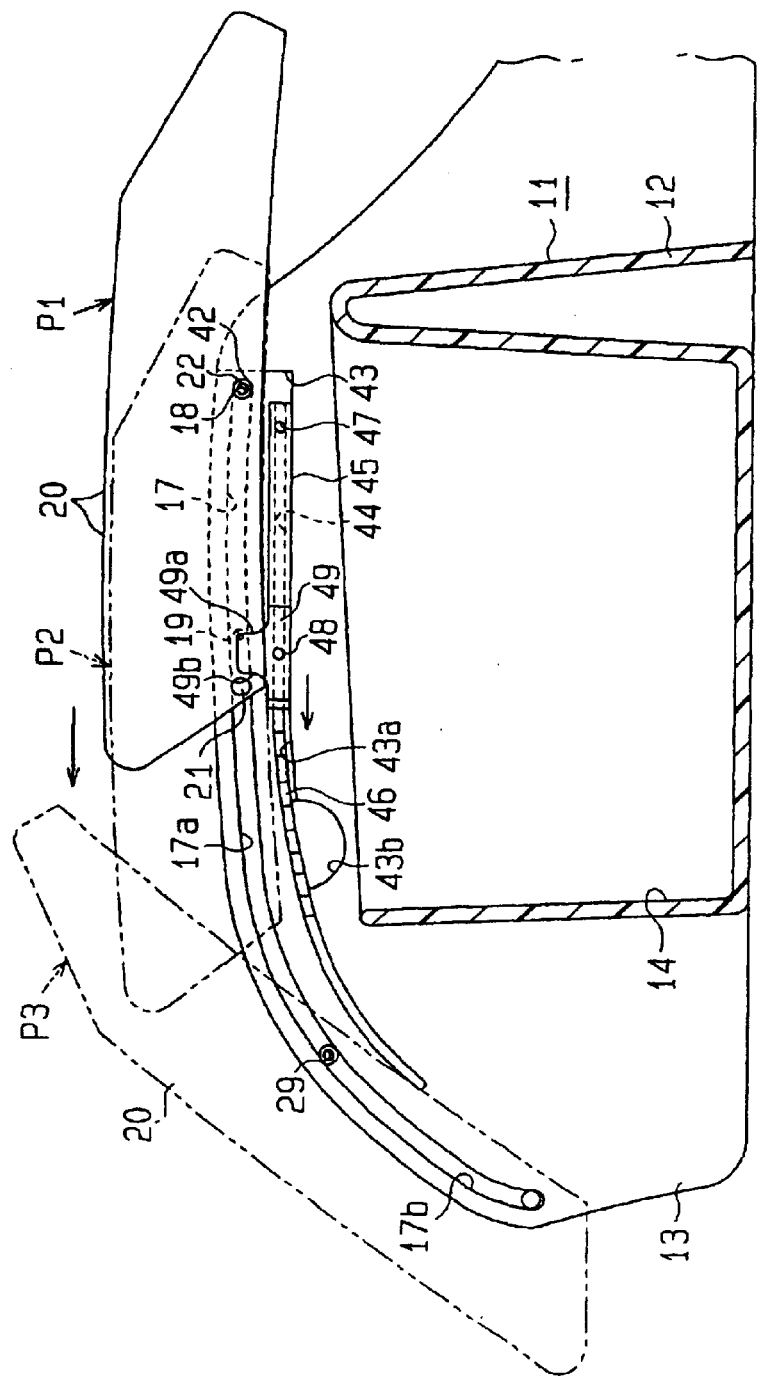
FIG. 18 is a vertical cross-sectional view illustrating the console box shown in FIG. 12, in which the armrest is at a front closing position.

When the armrest 20 is moved from the front closing position P1 shown in FIG. 18 to the rear closing position P2, the cylindrical pins 42 are engaged with the first engaging portions 49a of the pivot plates 49. Accordingly, the sliding plate 45 is moved rearward. Then, when the armrest 20 reaches the rear closing position p2 as shown in FIG. 17, the pivot plates 49 are moved to positions corresponding to the semicircular recesses 43b of the guide recesses 43. Also, the shutter 46 is moved along the shutter guide grooves 44 rearward away from the upper opening of the storage chamber 14.

Thereafter, when the armrest 20 is moved from the rear closing position P2 to the rear end position P3, the pivot plates 49 is rotated counterclockwise by ninety degrees with the cylindrical pins 42 in the semicircular recesses 43b of the guide recesses 43. The armrest 20 is held upright as shown in FIG. 13.

Figure 15:
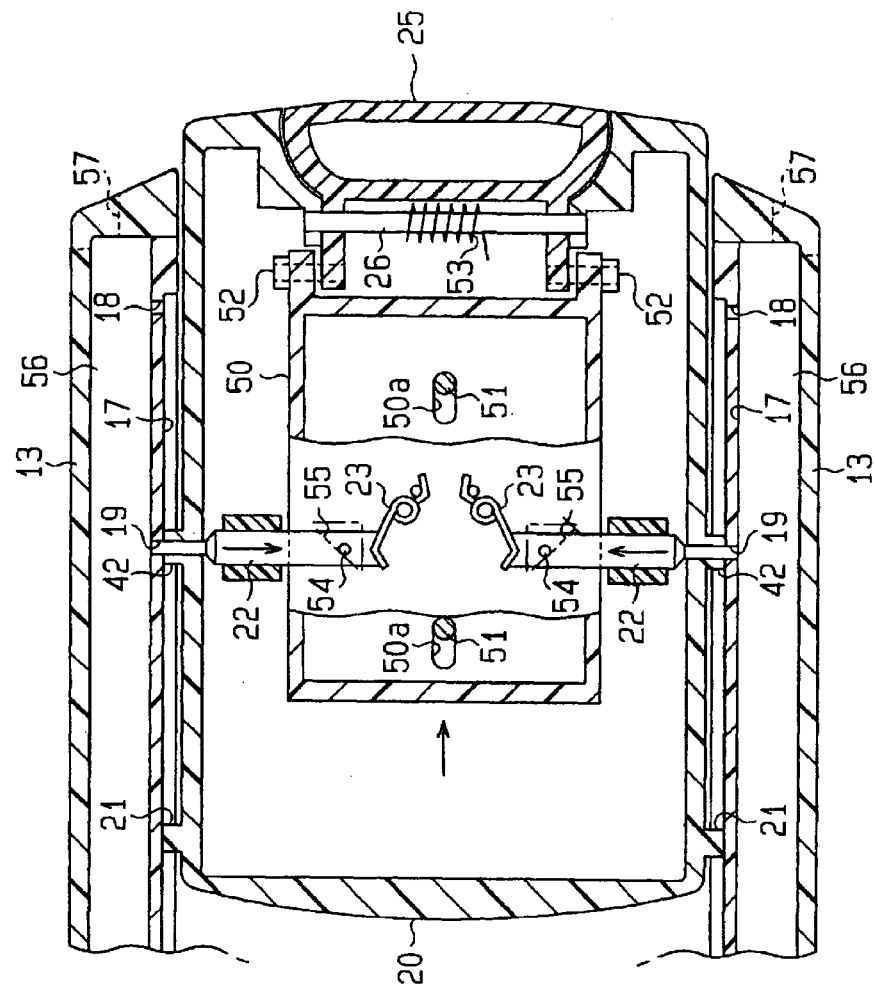
FIG. 15 is a horizontal cross-sectional view illustrating the operational lever of the console box shown in FIG. 12.
Figure 16:
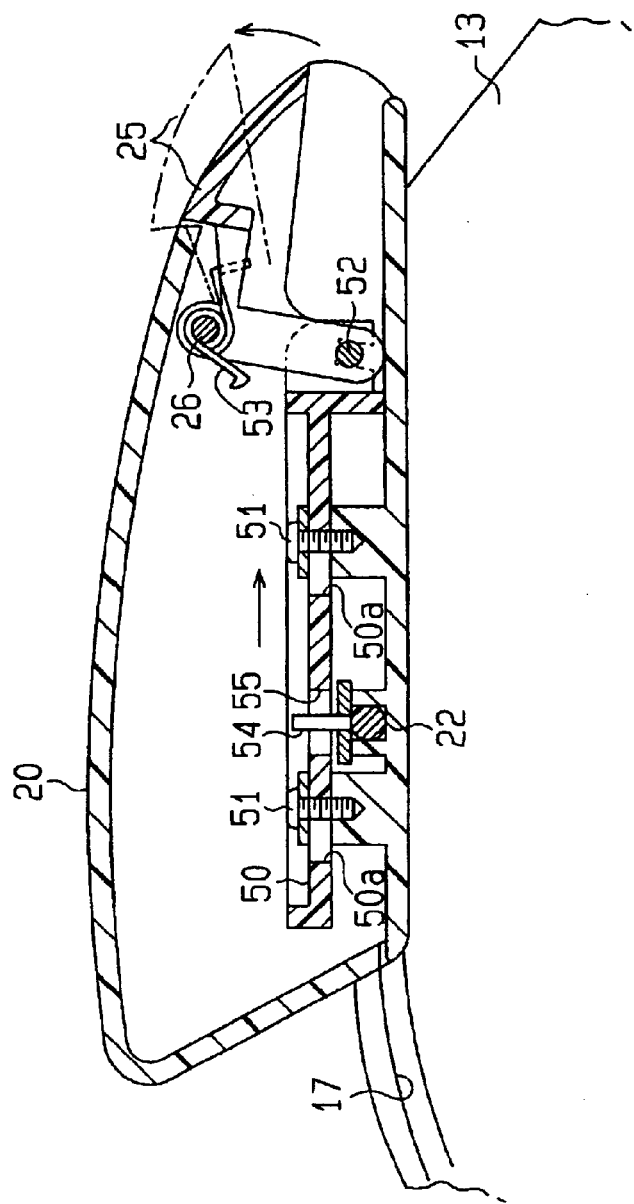
FIG. 16 is a vertical cross-sectional view illustrating the operational lever of the console box shown in FIG. 12.

In this embodiment, as shown in FIGS. 15 and 16, a movable member, which is a movable plate 50, is movably supported in the armrest 20. Specifically, the movable plate 50 has a pair of elongated holes 50a. A screw 51 is engaged with each elongated hole 50a such that the movable plate moves in the direction along which the armrest 20 is moved. A lever 25 is pivotally supported at the front of the armrest 20 with a shaft 26. The lever 25 is connected to the movable plate 50 with a pair of coupler pins 52. A spring 53 is fitted about the shaft 26. The spring 53 biases the lever 25 in a clockwise direction as viewed in FIG. 16 so that, in a normal state, the movable plate 50 is located at a rear position as shown in FIGS. 15 and 16.

A pair of springs 23 are provided on the movable plate 50. The springs 23 are engaged with the inner ends of the retractable pins 22 and bias the retractable pins 22 in a direction protruding from the cylindrical pins 42. An engaging pin 54 protrudes from the upper surface of each retractable pin 22. Triangular cam holes 55 are formed in the movable plate 50. Each engaging pin 54 is engaged with the corresponding cam hole 55. When the lever 25 is pivoted counterclockwise against the force of the spring 53, and the movable plate 50 is moved frontward, the engagement of the cam holes 55 and the engaging pins 54 moves the retractable pins 22 to positions where the retractable pins 22 are retracted in the cylindrical pins 42. Accordingly, the retractable pins 22 are disengaged from one of the first to third positioning recesses 18, 19, 29.

Figure 12:
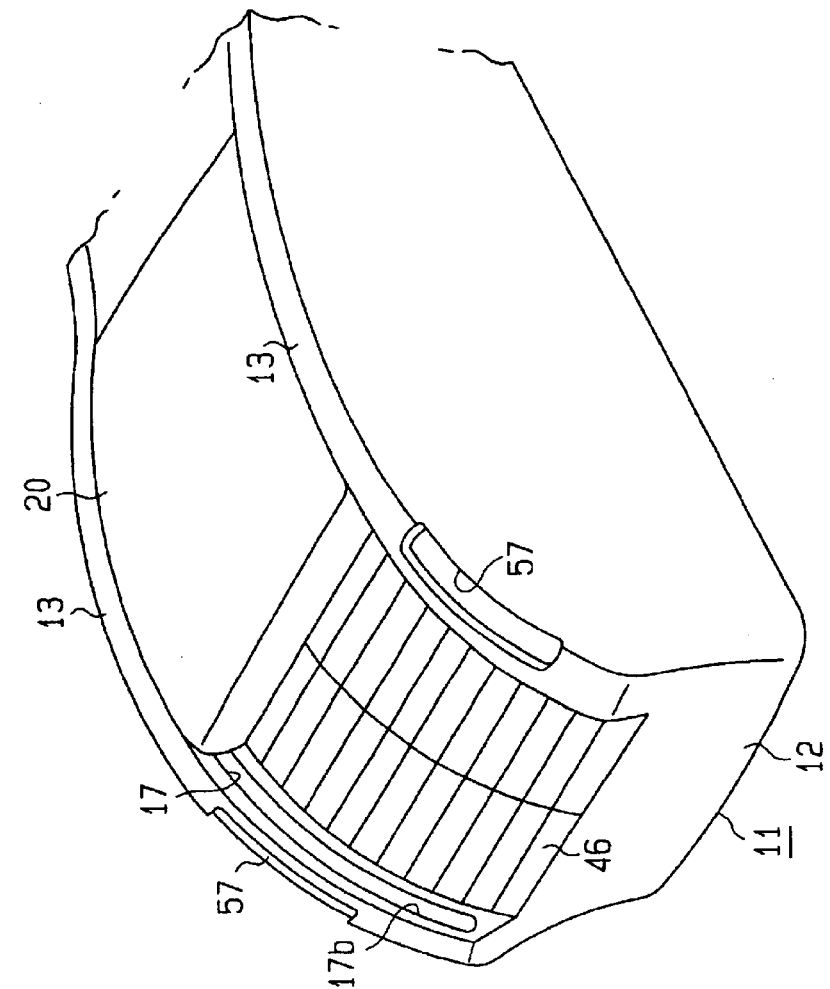
FIG. 12 is a perspective view illustrating a console box according to a fourth embodiment.

Also, as shown in FIGS. 12, 15, and 16, a hollow, which is an air passage 56, is formed in each sidewall 13 for air conditioning. The front end of each air passage 56 is connected to an air supplying part of an air conditioning system (not shown). A front air hole, which is an air inlet (not shown), is formed at the front end of each sidewall 13, and a rear air hole, which is an air outlet 57, is formed at the rear end of each sidewall 13. Air that is conditioned by the air conditioning system is drawn into each air passage 56 through the air inlet and discharged from the air outlet 57. Then, the air is blown toward the rear seat of the vehicle.

In addition to the advantages (1) through (3) of the first embodiment, the third embodiment provides the following advantages.

(7) The console box 11 has the shutter 46 between the sidewalls 13. As the armrest 20 is moved to the front closing position P1, the shutter 46 partially closes the rear part of the upper opening of the storage chamber 14 of the box main body 12. Therefore, even if the armrest 20 is permitted frontward by a relatively great amount, or even if the size of the storage chamber 14 is increased and the upper opening is large, the interior of the storage chamber 14 is not exposed when the armrest 20 is moved to the front closing position P1 and the upper opening of the storage chamber 14 is opened. This permits the position of the armrest 20 to be adjusted in a wide range. In other words, the position of the armrest 20 can be adjusted to a wide range of the figure of a passenger. Also, the capacity of the storage chamber 14 is improved.

(8) The air passage 56 is formed each sidewall 13, and the air outlet 57 is formed in the rear end of each sidewall 13. Therefore, additional air passages and air outlets for air conditioning are not required. This simplifies the structure and reduces the number of parts.

A fifth embodiment of the present invention will now be described with reference to FIGS. 19 and 20. The differences from the first embodiment will mainly be discussed.

Figure 19:
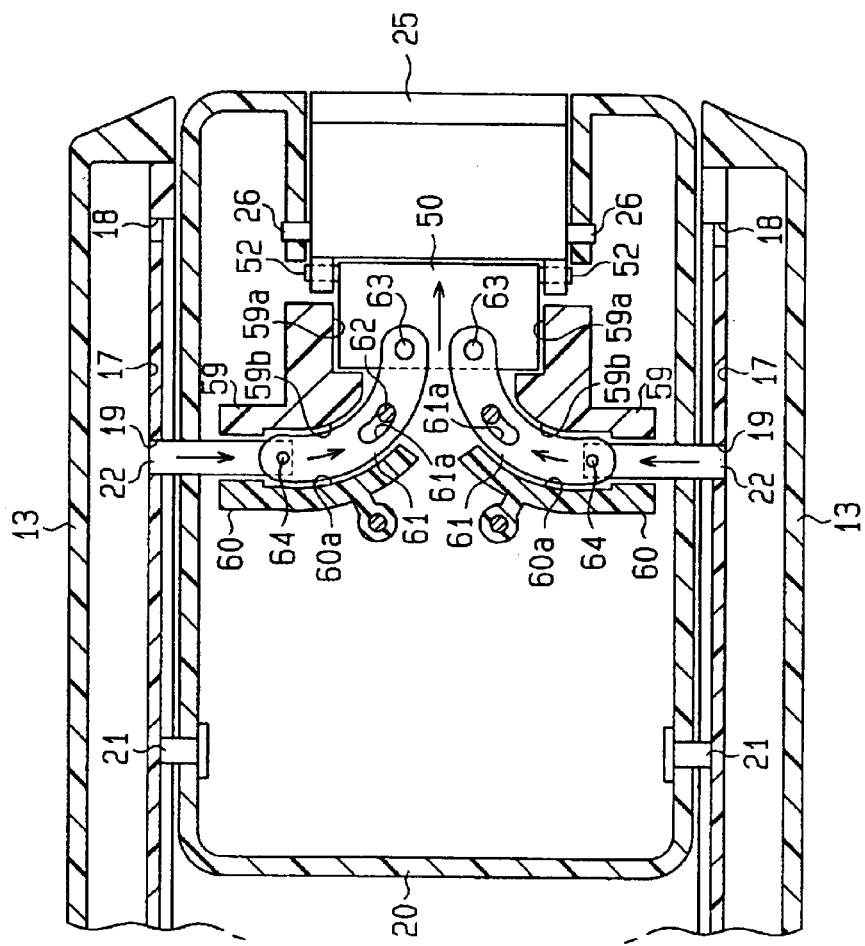
FIG. 19 is a horizontal cross-sectional view illustrating a console box according to a fifth embodiment.
Figure 20:
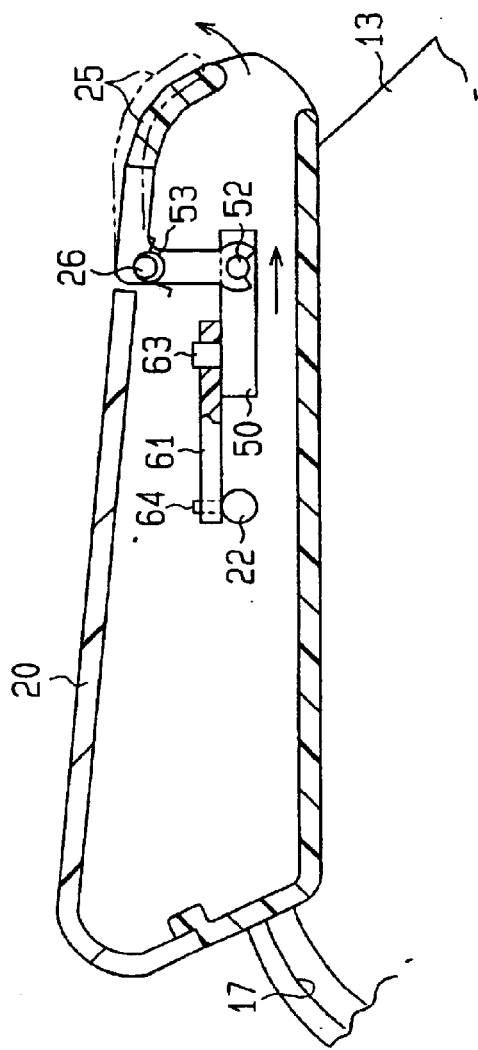
FIG. 20 is a vertical cross-sectional view illustrating the console box shown in FIG. 19.

As shown in FIGS. 19 and 20, a pair of left and right guide members 59 are formed on the upper surface of the lower wall of the armrest 20, and a pair of left and right guide members 60 are formed on the lower surface of the upper wall of the armrest 20. A flat guide surface 59a is formed on the inner surface of each guide member 59. The flat guide surfaces 59a extend along the moving direction of the vehicle. A convex shaped arcuate guide surface 59b is formed at the rear end of each guide member 59. A concave shaped arcuate guide surface 60a is formed in the front end of each guide member 60. The arcuate guide surface 60a of each guide member 60 corresponds to the arcuate guide surface 59b of the corresponding guide member 59. A moving member, which is a movable plate 50, is movably supported between the flat guide surfaces 59a of the guide members 59. As in the fourth embodiment, the front end of the movable plate 50 is coupled to the lever 25 with coupler pins 52.

A coupler member, which is a coupler plate 61, is movably supported between each arcuate guide surface 59b of the guide member 59 and the arcuate guide surface 60a of the corresponding guide member 60. Each arcuate coupler plate 61 has an arcuate hole 61a, and a fixed guide pine 62 is engaged with the arcuate hole 61a to permit the coupler plate 61 to move in an arcuate path. The inner end of each coupler plate 61 is coupled to the movable plate 50 with a coupler pin 63. The outer end of each coupler plate 61 is coupled to one of the retractable pins 22 with a coupler pin 64. When the lever 25 is pivoted counterclockwise as viewed in FIG. 20 against the force of the spring 53, and the movable plate 50 is moved frontward, the coupler plates 61 are arcuately moved frontward along the arcuate guide surfaces 59b, 60a. Accordingly, the retractable pins 22 are retracted. Accordingly, the retractable pins 22 are disengaged from one of the first to third positioning recesses 18, 19, 29.

In addition to the advantages (1) through (3) of the first embodiment, the third embodiment provides the following advantages.

(9) The movable plate 50 and the retractable pins 22, which are moved by pivoting of the lever 25, are coupled to each other by the arcuate coupler plates 61, which move in arcuate paths. Therefore, the direction of movement of the movable plate 50 is converted by the coupler plates 61 and transmitted to the retractable pins 22. Accordingly, the number of parts is reduced, and the structure for disengaging the retractable pins 22 is simplified. Also, the retractable pins 22 are easily disengaged from one of the positioning recesses 18, 19, 29 by pivoting the lever 25.

A sixth embodiment of the present invention will now be described with reference to FIGS. 21 and 22. The differences from the first embodiment will mainly be discussed.

Figure 21:
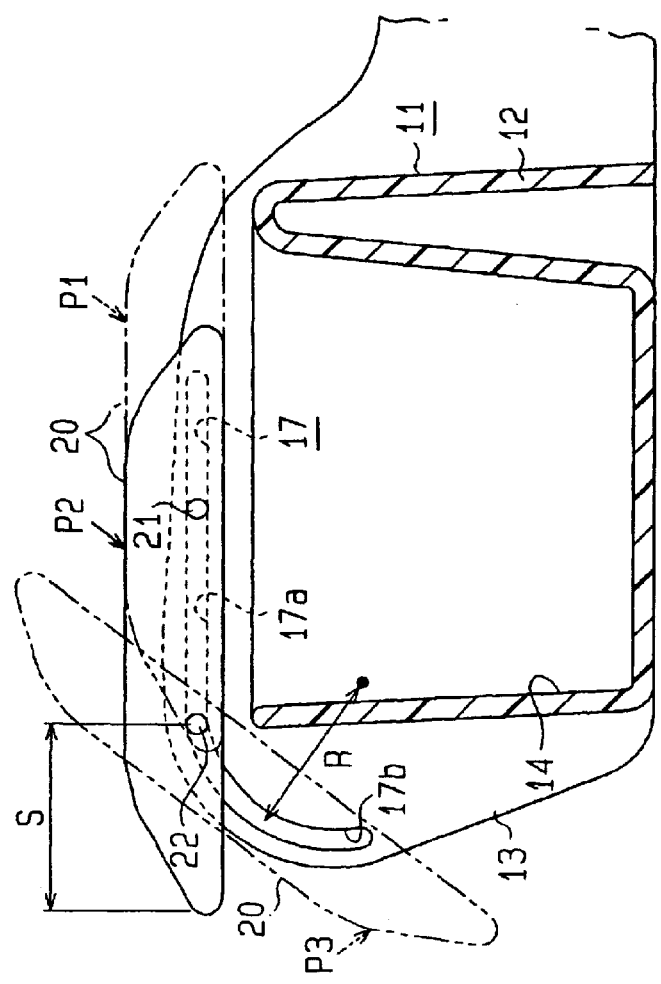
FIG. 21 is a vertical cross-sectional view illustrating a console box according to a sixth embodiment.
Figure 22:
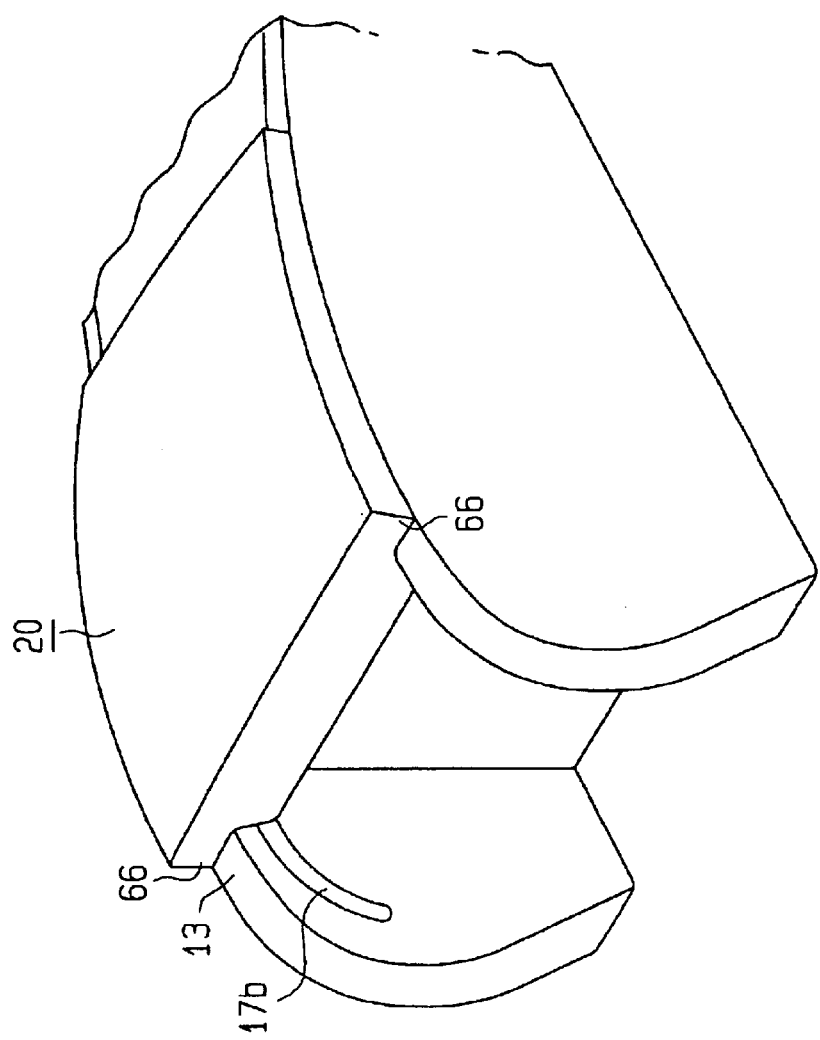
FIG. 22 is a perspective view illustrating the console box shown in FIG. 21.

As shown in FIGS. 21 and 22, front and rear engaging pins 21, 22 protrude from each side of the armrest 20. The distance between the rear end of the armrest 20 and each rear engaging pin 22 is represented by a distance S. A guide groove 17 including a front inclined section 17a and a rear inclined section 17b is formed in each sidewall 13. Each rear inclined section 17b extends downward and is formed arcuately about a point with a radius of curvature R, which is less than those in the previous embodiments.

An overhung portion 66 is formed at each side of the armrest 20. Each overhung portion 66 located on the corresponding sidewall 13.

In addition to the advantages (1) through (3) of the first embodiment, the third embodiment provides the following advantages.

(10) As shown by chain lines in FIG. 21, the armrest 20 is upright when moved to the rear end position P3 and widely opens the upper opening of the storage chamber 14. At the rear end position P3, the front end of the armrest 20 does not overlap the box main body 12 by a great amount, the armrest 20 does not hinder articles from being taken out of or put in the storage chamber 14.

In addition, since the rear inclined sections 17b of the guide grooves 17 are formed arcuate with a radius of curvature R, the armrest 20 is moved in an arcuate path. This prevents the armrest 20 from interfering with the sidewalls 13. This reduces the limitations to the shape of the armrest 20. That is, even if the overhung portions 66 are provided as described above, the overhung portions 66 do not interfere with the sidewalls 13. Thus, the area of the armrest 20 is increased by forming the overhung portions 66. Accordingly, the armrest 20 is capable of comfortably support an arm of a passenger. This adds to a luxurious appearance.

A seventh embodiment of the present invention will now be described with reference to FIGS. 23 to 26. The differences from the first embodiment will mainly be discussed.

In the seventh embodiment, a pocket 70 is formed in a rear part of the box main body 12. A cover 71 is provided at the pocket 70. The cover 71 covers rear section of the guide grooves 17 from above and functions as a lid of the pocket 70.

Figure 23:
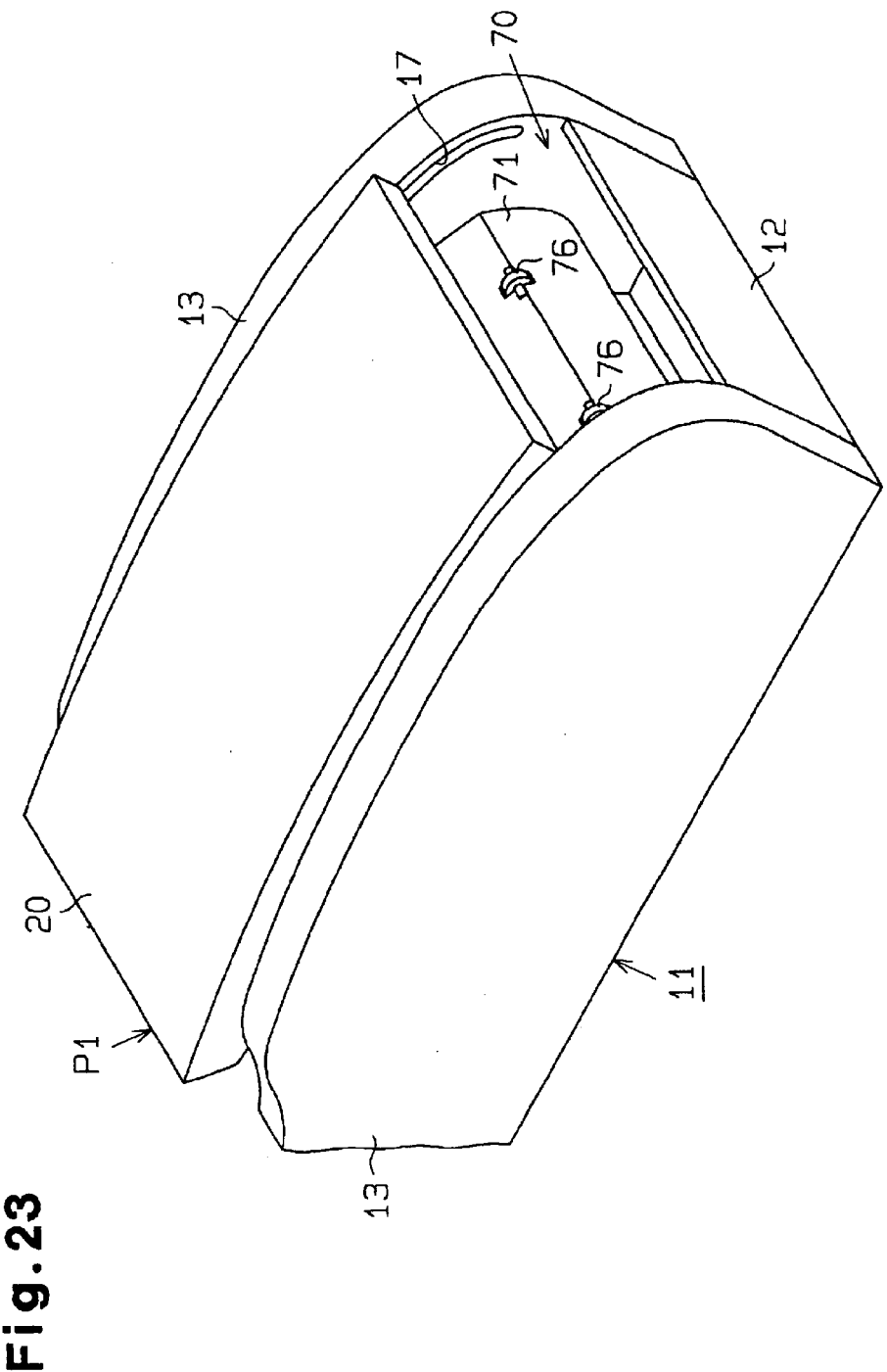
FIG. 23 is a perspective view illustrating a console box according to a seventh embodiment.
Figure 24:
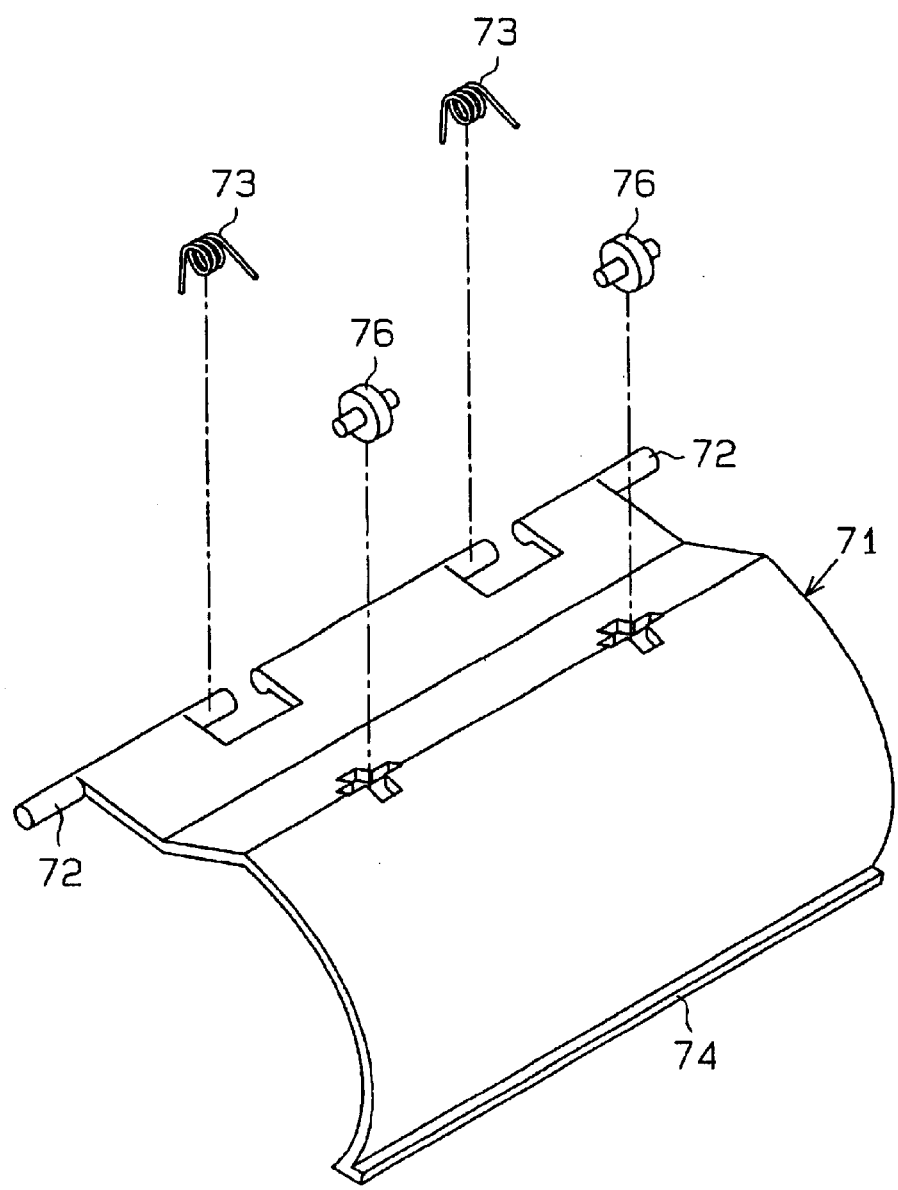
FIG. 24 is an exploded perspective view illustrating the cover member of the console box shown in FIG. 23.
Figure 25:
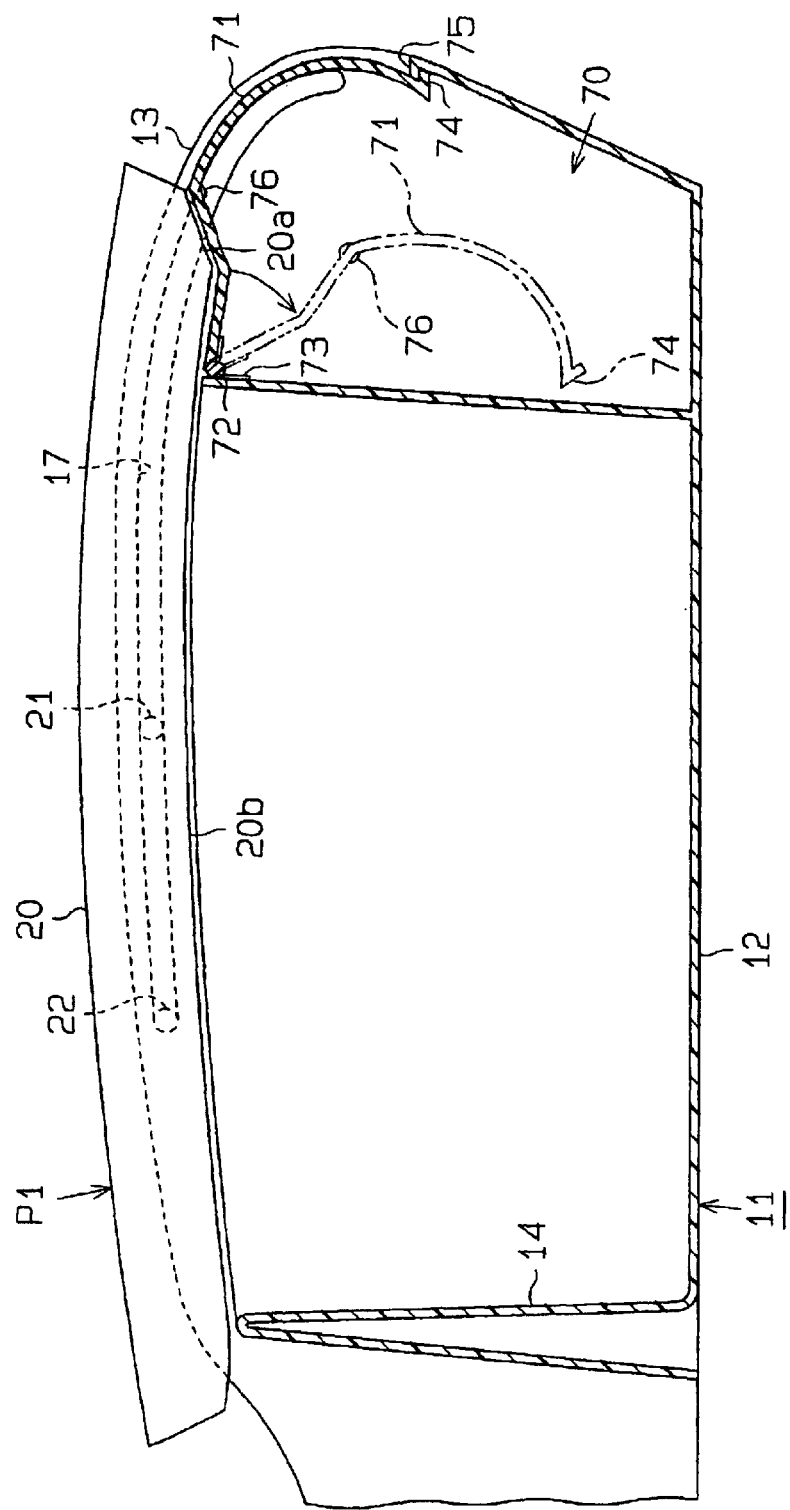
FIG. 25 is a vertical cross-sectional view illustrating the console box shown in FIG. 23, in which the armrest is at a closing position.
Figure 26:
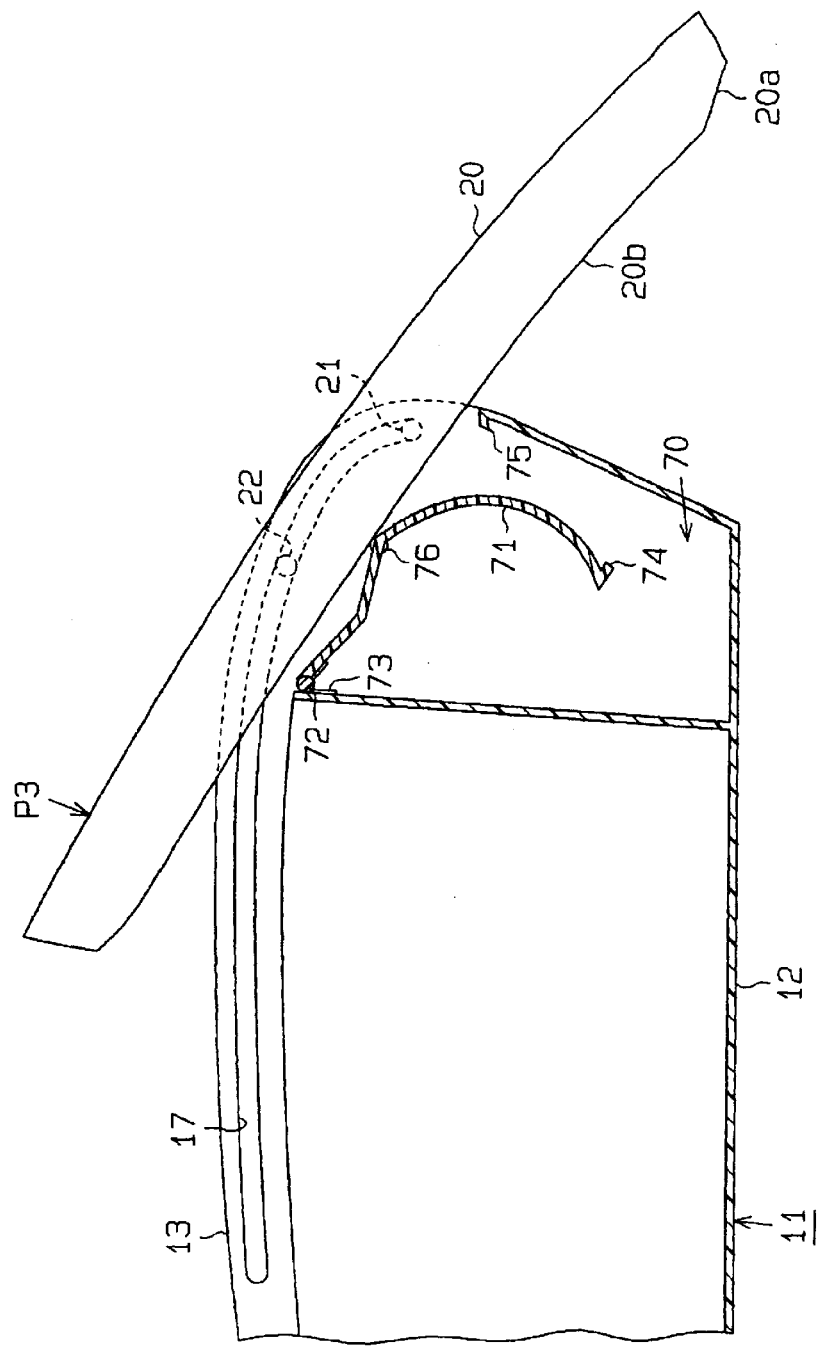
FIG. 26 is a vertical cross-sectional view illustrating the console box shown in FIG. 23, in which the armrest is at a rear end position.

That is, as shown in FIGS. 24 to 26, the cover 71 is supported by the sidewalls 13 with support shafts 72 provided at the front end. The support shafts 72 are engaged with small holes formed in the sidewalls 13 so that the cover 71 pivots vertically. The cover 71 is biased upward by torsion springs 73. When the armrest 20 is at the front closing position P1 to close the upper opening of the storage chamber 14, the cover 71 is biased by the force of the coil springs 73 and located at an upper position. In this state, a hook portion 74 is engaged with an engaging end 75 formed in the rear wall of the pocket 70. The cover 71 is therefore closes the pocket 70. FIG. 23 illustrates a state in which the armrest 20 is at the front closing position P1, and the cover 71 is pushed into the pocket 70.

A pair of left and right rollers 76 are provided in a front part of the cover 71. The rollers 76 contact inclined surface 20a and a lower surface 20b formed on a rear part of the armrest 20. As the armrest 20 is moved rearward from the front closing position P1, the cover 71 is gradually pressed downward against the force of the torsion springs 73 by means of the rollers 76 contacting the inclined surface 20a and the lower surface 20b. Accordingly, the armrest 20 is moved along the guide grooves 17. The shape of the front portion of the cover 71 conforms to the lower side of the lower portion of the armrest 20.

Therefore, when the armrest 20 is at the front closing position P1, pressing down the cover 71 with a hand allows articles to be taken out of and put in the pocket 70.

As the armrest 20 is moved from the front closing position P1 to the rear end position P3, the cover 71 is pressed down by the inclined surface 20a and the lower surface 20b of the armrest 20. Accordingly, the armrest 20 is moved to the rear end position P3 along the guide grooves 17.

In addition to the advantages (1) through (3) of the first embodiment, the third embodiment provides the following advantages.

(11) When the armrest 20 is at the front closing position P1, which is a normal use position, to close the storage chamber 14, portions of the guide grooves 17 are covered from above by the cover 71 at a position rearward of the armrest 20. This improves the appearance of the console box 11.

The cover 71 functions as a lid of the pocket 70, which is provided at the rear of the box main body 12. The cover 71 can be opened and closed independently from the armrest 20.

An eighth embodiment of the present invention will now be described with reference to FIGS. 27 to 33. The differences from the first embodiment will mainly be discussed.

Figure 27:
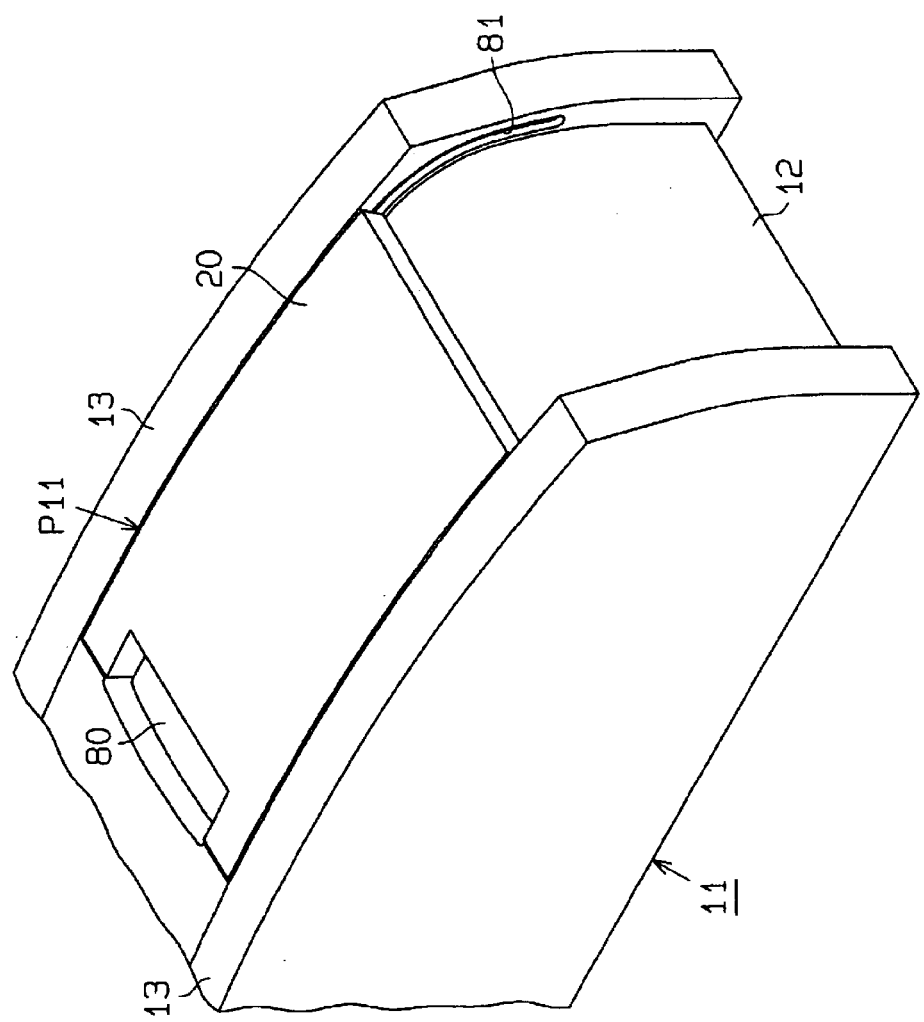
FIG. 27 is a perspective view illustrating a console box according to an eighth embodiment.

In the eighth embodiment, as shown in FIG. 27, a handle 80 is provided at the upper rear end of the armrest 20. The handle 80 is used when moving the armrest 20 rearward.

Figure 28:
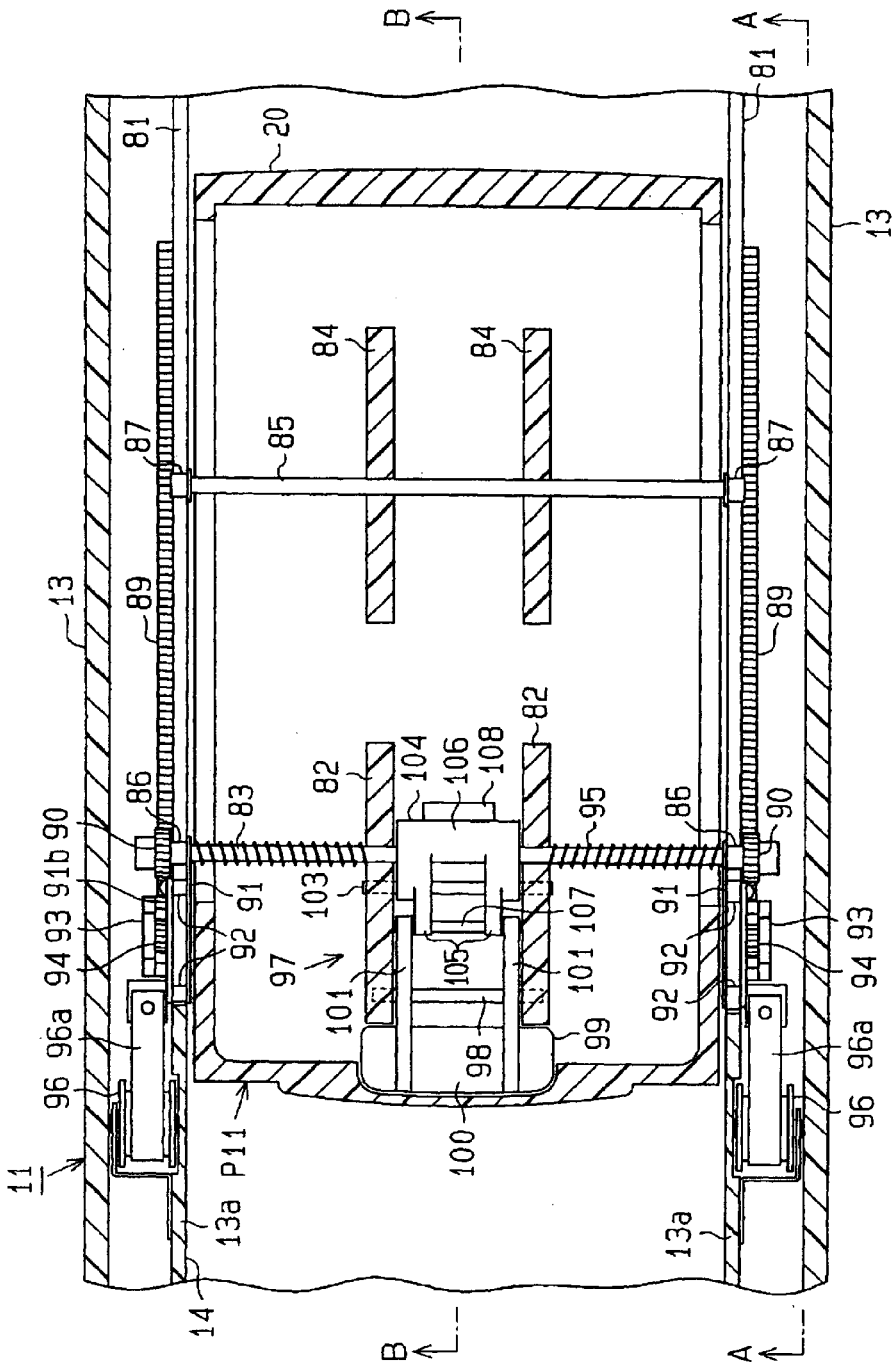
FIG. 28 is a horizontal cross-sectional view illustrating the armrest of the console box shown in FIG. 27.
Figure 29A:
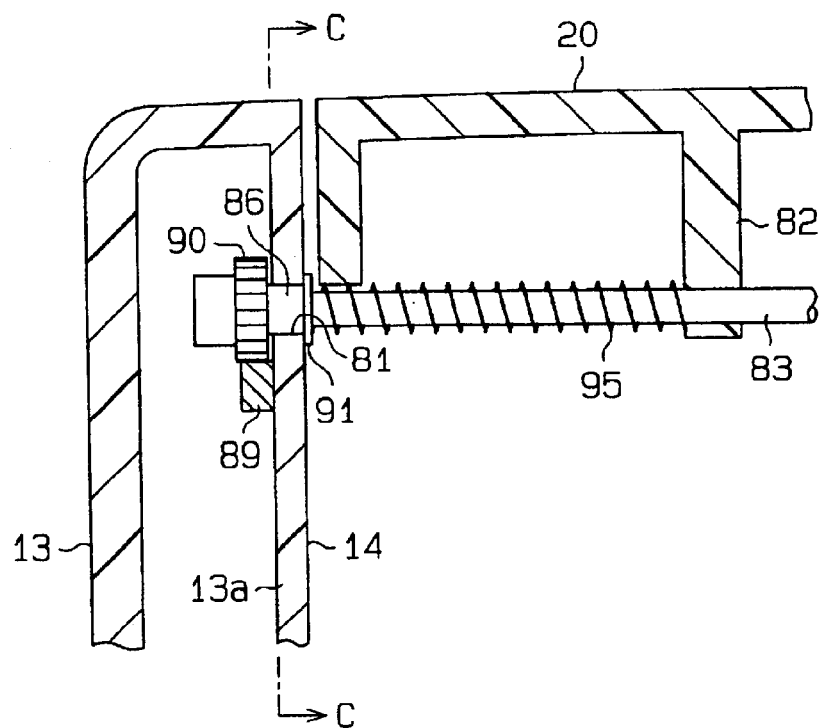
FIG. 29(*a*) is a vertical cross-sectional view illustrating a part of the console box shown in FIG. 27.
Figure 30:
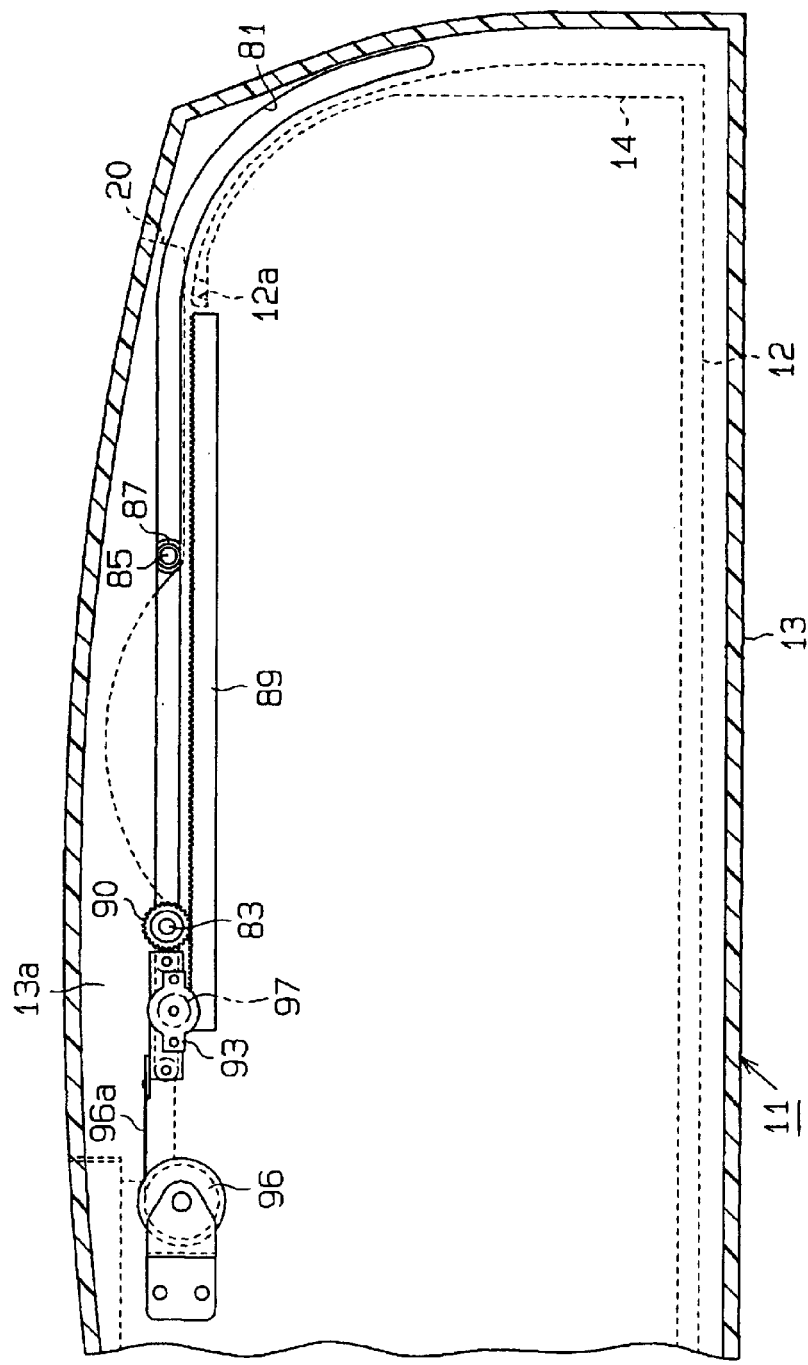
FIG. 30 is a cross-sectional view taken along line A—A of FIG. 28.

As shown in FIGS. 28, 29(a), and 30, the sidewalls 13 have a double structure, and each have an inner wall 13a. A guide portion, or a guide groove 81, is formed in each inner wall 13a. The guide groove 81 extends in the moving direction of the vehicle.

A pair of front supports 82 protrude from a front lower part of the armrest 20. The front supports 82 rotatably support a front lateral support shaft 83. A collar 86 is rotatably supported at each end of the front support shaft 83. Each collar 86 is supported by and rolls relative to the corresponding guide groove 81. A pair of rear supports 84 protrude from a rear lower part of the armrest 20. The rear supports 84 rotatably support a rear lateral support shaft 85. A collar 87 is rotatably supported at each end of the rear support shaft 85. Each collar 87 is supported by and rolls relative to the corresponding guide groove 81. That is, the armrest 20 is supported between the sidewalls 13 with the collars 86, 87 of the front and rear support shafts 83, 85, so that the armrest 20 moves frontward and rearward along the guide grooves 81.

A rack 89 is fixed to the outer side of each inner wall 13a. Each rack 89 is located below the corresponding guide groove 81 and extends in the moving direction of the vehicle. A pinion 90 is fixed to each end of the front support shaft 83. Each rack 89 is engaged with one of the pinions 90.

Figure 29B:
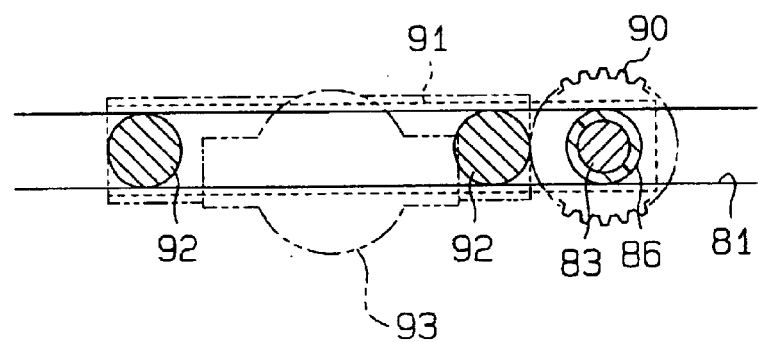

A plate 91 is rotatably supported at each end portion of the front support shaft 83. Each plate 91 is located at the inner side of one of the inner wall 13a. As shown in FIGS. 28 and 29(b), front and rear support shafts 92 are provided in each guide groove 81. Braking means, which is a conventional rotatable damper 93, is fixed to each plate 91 with the corresponding shafts 92. Each damper 93 has an input-output pinion 94 engaged with the corresponding rack 89. As the armrest 20 is moved, the input-output pinions 94 are rotated. At this time, the dampers 93 brake the armrest 20.

A pair of torsional springs 95 are provided about the front shaft 83. One end of each torsional spring 95 is engaged with the corresponding front support 82. The other end of the torsional spring 95 is engaged with the front support shaft 83. When the armrest 20 is moved rearward, the front support shaft 83 is rotated, and the torsional springs 95 are gradually twisted against the elasticity.

A conventional constant spring 96 is provided at the outer side of each inner wall 13a. Each constant spring 96 has a helical spring 96a. The distal end of the helical spring 96a is coupled to the corresponding plate 91. Accordingly, the armrest 20 is biased frontward. When the armrest 20 is moved rearward from the front closing position P1, the constant springs 96 moves the armrest 20 to the front closing position P1 and hold the armrest 20 at the front closing position P1. In this embodiment, the torsional springs 95 and the constant springs 96 form biasing mechanism.

Figure 31:
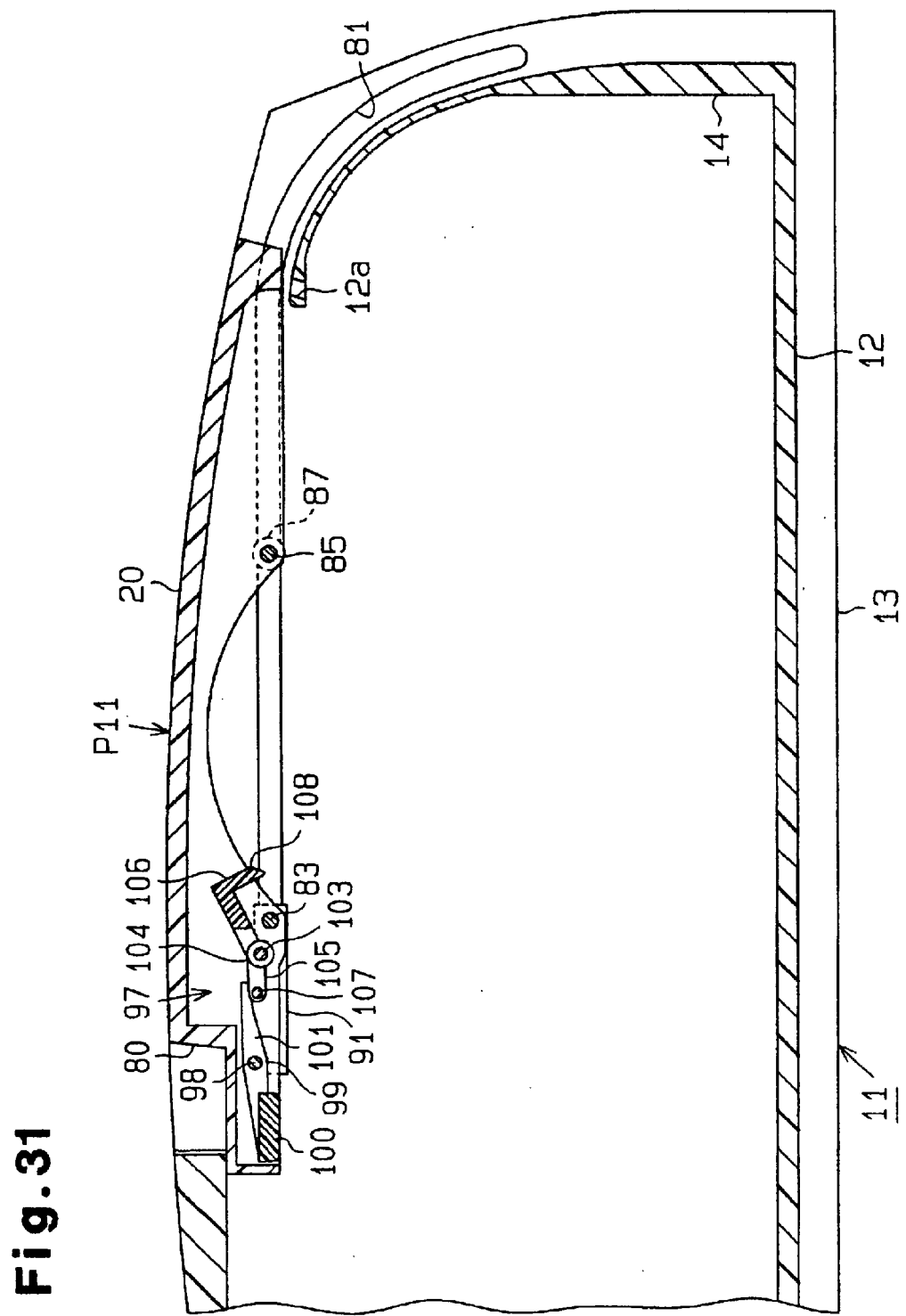
FIG. 31 is a cross-sectional view taken along line B—B of FIG. 28.
Figure 33:
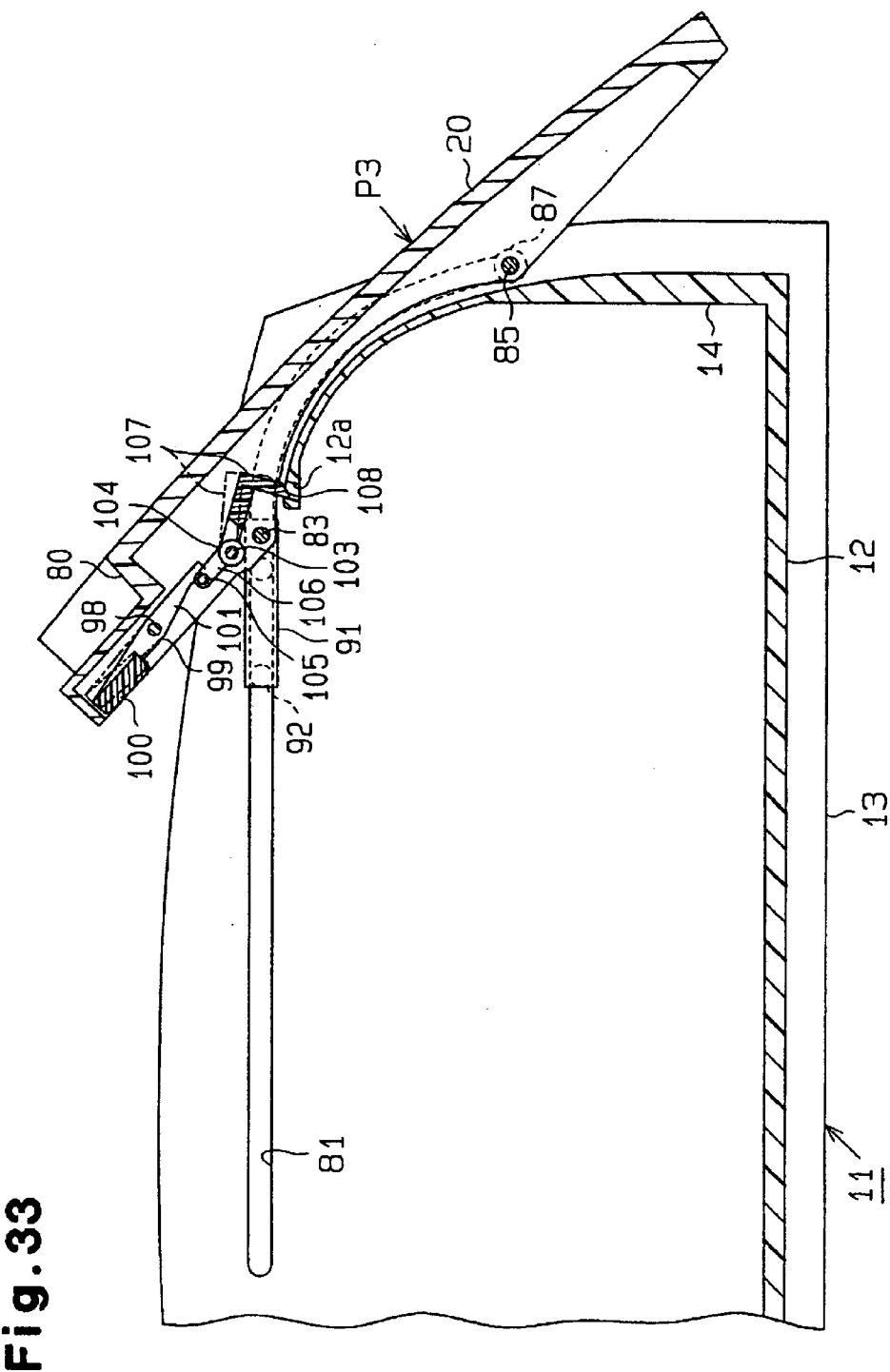
FIG. 33 is a vertical cross-sectional view illustrating the console box shown in FIG. 27.

As shown in FIGS. 28, 31, and 33, holding means, which is a holding mechanism 97, is provided at a front lower part of the armrest 20. The holding mechanism 97 holds the armrest 20 at the rear end position P3, where the armrest 20 opens the upper opening of the box main body 12. The holding mechanism 97 will now be described.

A first support shaft 98 is supported by the front supports 82. A first lever 99 is supported at a front lower part of the armrest 20 with the first support shaft 98. The first lever 99 has a handle portion 100 located at lower front end of the armrest 20 and a pair of left and right link bars 101 extending rearward from the first support shaft 98. The first lever 99 is biased counterclockwise by a spring (not shown) as viewed in FIG. 31.

A second lever 104 is provided at a front lower part of the armrest 20. The second lever 104 is located behind the first lever 99. The second lever 104 is pivotally supported by a second support shaft 103 supported by the front supports 82. The second lever 104 has a pair of left and right input portion 105 extending frontward from the second support shaft 103 and an output portion 106 provided behind the second support shaft 103. A rod 107 is supported by the input portions 105. The rod 107 is engaged with the link bars 101. The output portion 106 has a claw 108, and an engaging hole 12a is formed in the upper end of the rear wall of the box main body 12. The claw 108 is engaged wit the engaging hole 12a. The second lever 104 is biased clockwise by a spring (not shown) as viewed in FIG. 31.

The operations of the console box 11, which is constructed as above, will hereafter be described.

When moving the armrest 20 from the front closing position P1 to the rear end position P3 with a hand placed on the handle 80, the collars 86, 87 are guided by the guide grooves 81. Accordingly, the armrest 20 is moved rearward without rattling. At this time, as the armrest 20 is moved rearward, the pinions 90 are rotated by the rack 89, thereby gradually twisting the torsional springs 95.

Figure 32:
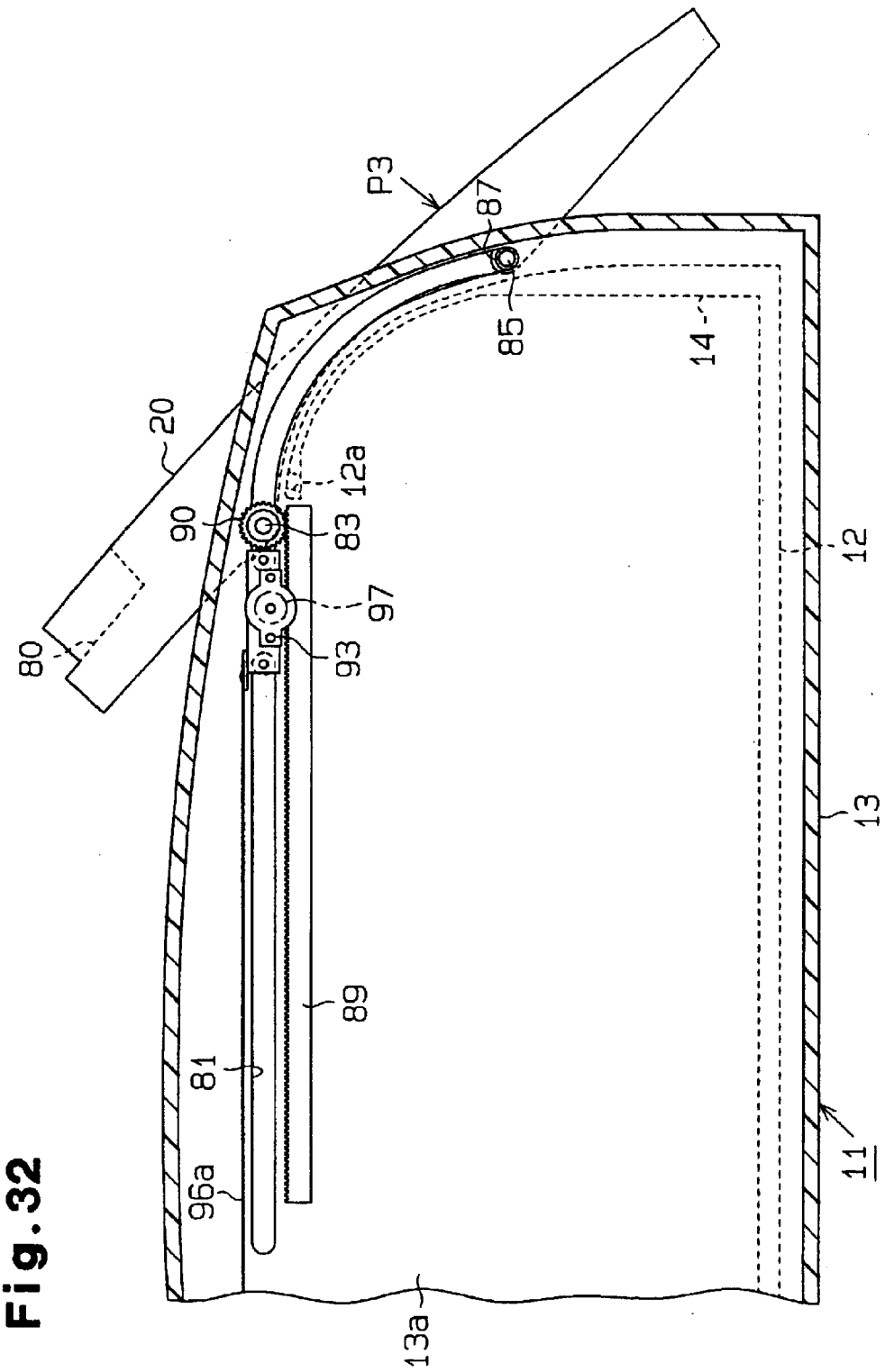
FIG. 32 a vertical cross-sectional view illustrating the console box shown in FIG. 27, in which the armrest is at a rear end position.

As the armrest 20 is moved further rearward, the collars 87 supported by the rear support shaft 85 is guided by the guide groves 81. Accordingly, the rear portion of the armrest 20 is lowered, and the armrest 20 is gradually moved to an upright position. When the armrest 20 reaches the rear end position P3, the claw 108 of the output portion 106 contacts the upper end of the rear wall of the box main body 12. Then, the second lever 104 is pivoted against the force of the corresponding spring (not shown). As shown in FIGS. 32 and 33, when the armrest 20 reaches the rear end position P3, the claw 108 is engaged with the engaging hole 12a. Accordingly, the armrest 20 is held at the rear end position P3.

In this state, if a hand is placed on the handle 80 of the armrest 20 at the rear end position P3, and the handle portion 100 of the first lever 99 is pulled, the link bars 101 pushes down the input portion 105 with the rod 107 as shown by two-dot chain line, which disengages the claw 108 of the output portion 106 from the engaging hole 12a. Then, the armrest 20 is moved frontward from the rear end position P3 by the force of the torsional springs 95 and the constant springs 96. At this time, due to the braking effect of the damper 93, the armrest 20 is prevented from being quickly moved. That is, the armrest 20 is slowly moved frontward and is then held at the front closing position P1.

In addition to the advantages (1) through (3) of the first embodiment, the third embodiment provides the following advantages.

(12) After the armrest 20 is moved from the front closing position P1 to the rear end position P3, the armrest 20 is automatically returned from the rear end position P3 to the front closing position P1 by the torsional springs 95 and the constant springs 96. Therefore, when the box main body 12 is opened, the armrest 20 need not be manually put back to the front closing position P1. This improves the usability of the console box 11.

Further, the armrest 20 can be held at the rear end position P3. Therefore, when the box main body 12 is opened, the armrest 20 need not be manually held at the rear end closing position P3. This further improves the usability of the console box 11.

It should be apparent to those skilled in the art that the present invention may be embodied in many other specific forms without departing from the spirit or scope of the invention. Particularly, it should be understood that the invention may be embodied in the following forms.

In the first embodiment, the box main body 12 of the console box 11 may be integrally formed with the sidewalls 13.

In the illustrated embodiments, guide projections may be formed on the inner surfaces of the sidewalls 13, and engaging recesses may be formed on both sides of the armrest 20.

In the first to sixth embodiments, three or more positioning recesses may be formed in the front inclined section 17a of each guide groove 17, and the armrest 20 may be positioned at one of the three or more positions.

In the first to seventh embodiments, the positions of the fixed pins 21 and the retractable pins 22 on the sides of the armrest 20 may be reversed.

In the fourth embodiment, the armrest 20 may be constructed to move between two positions, that is, between a closing position for closing the upper opening of the storage chamber 14, and an opening for opening the upper opening of the storage chamber 14. In this case, when the armrest 20 is moved from the opening position to the closing position, the shutter 46 closes a part of the upper opening of the storage chamber 14.

In the eighth embodiment, the torsional springs 95 or the constant springs 96 may be omitted.

In the eighth embodiment, one end of each torsional spring supporting the front support shaft 83 may be engaged with the corresponding guide groove 81, and the other end may be engaged with the back of the armrest 20. In this structure, the torsional springs are twisted as the armrest 20 approaches the rear end position P3. When the armrest 20 is at the rear end position P3, a frontward pivoting force is applied to the armrest 20 about the front support shaft 83. This permits the armrest 20 to be smoothly moved frontward from the rear end position P3.

In the eighth embodiment, force generated by movement of the armrest 20 may be transmitted to the damper 93 with a one-way clutch. When the armrest 20 is being moved rearward, force due to the movement of the armrest 20 is not transmitted to the damper 93. When the armrest 20 is moved frontward, the one-way clutch is engaged, and braking effect is applied to the armrest 20. This structure does not limit the moving speed of the armrest 20 when the armrest 20 is moved rearward to open the box main body 12. Accordingly, the usability of the console box 11 is improved.

The present examples and embodiments are to be considered as illustrative and not restrictive and the invention is not to be limited to the details given herein, but may be modified within the scope and equivalence of the appended claims.

What is claimed is:

1. A console box mounted on a vehicle, comprising:
a box main body:
first and second sidewalls that are arranged in a lateral direction of the vehicle and face each other, wherein the box main body is located between the first and second sidewalls, wherein each of the first and second sidewalls has a guide portion extending in a moving direction of the vehicle, and wherein the guide portions are formed in facing surfaces of the first and second sidewalls; and
an armrest that is located above the box main body and between the first and second sidewalls, wherein the armrest has a first surface facing the first sidewall and a second surface facing the second sidewall, wherein an engaging portion is provided on each of the first and second surfaces, and each engaging portion is slidably engaged with the corresponding guide portion such that the armrest is supported between the first and second sidewalls and slidable in the moving direction of the vehicle,
wherein the guide portions are grooves, and the engaging portions are projections, wherein each of the guide portions has a recess connected to the guide portion, wherein the engaging portions are one of a plurality of engaging portions provided on the first surface and one of a plurality of engaging portions provided on the second surface, wherein each of one of the engaging portions on the first surface and one of the engaging portions on the second surface corresponds to one of the recesses, and functions as a positioning member that is moved between an engaging position where the positioning member is engaged with the corresponding recess and a non-engaging position where the positioning member is not engaged with the corresponding recess, wherein, when each positioning member is not engaged with the corresponding recess, the armrest is slidable, and wherein, when each positioning member is engaged with the corresponding recess, the armrest is not slidable.

2. The console box according to claim 1, wherein the box main body has an opening, wherein the armrest slides between a closing position for closing the opening and an opening position for opening the opening, thereby functioning as a lid for selectively opening and closing the opening.

3. The console box according to claim 2, wherein the armrest slides frontward, thereby moving toward the closing position, and slides rearward, thereby moving toward the opening position.

4. The console box according to claim 3, wherein the engaging portions are provided in portions of the armrest that are spaced apart from the rear end of the armrest by a predetermined distance along the moving direction of the vehicle.

5. The console box according to claim 1, wherein the positioning members are retractable into the armrest, and wherein each positioning member is projected from and retracted into the armrest to move between the engaging position and the non-engaging position.

6. The console box according to claim 5, wherein each positioning member is provided with a biasing member, wherein, when each positioning member is at the non-engaging position, the corresponding biasing member biases the positioning member toward the engaging position.

7. The console box according to claim 6, wherein the armrest has a lever, and wherein, when at the engaging position, the positioning members move to the non-engaging position against the force of the biasing member in response to manipulation of the lever.

8. The console box according to claim 1, wherein the guide portions ascend frontward so that the armrest ascends as the armrest moves frontward.

9. The console box according to claim 2, wherein the armrest can be moved from the opening position to a retreat position, at which the armrest is generally off a position above the box main body.

10. The console box according to claim 9, wherein each of the first and second sidewalls has an auxiliary guide portion that branches from the corresponding guide portion, wherein each engaging portion is selectively engaged with the corresponding guide portion and the corresponding auxiliary guide portion, which branches from the guide portion, wherein, when each engaging portion is engaged with the corresponding auxiliary guide portion, the armrest is upright and at the retreat position.

11. The console box according to claim 1, wherein a rear end part of each guide portion extends arcuately.

12. A console box mounted on a vehicle, comprising:
a box main body:
first and second sidewall, that are arranged in a lateral direction of the vehicle and face each other, wherein the box main body is located between the first and second sidewalls, wherein each of the first and second sidewalls has a guide portion extending in a moving direction of the vehicle, and wherein the guide portions are formed in facing surfaces of the first and second sidewalls; and
an armrest that is located above the box main body and between the first and second sidewalls, wherein the armrest has a first surface facing the first sidewall and a second surface facing the second sidewall, wherein an engaging portion is provided on each of the first and second surfaces, and each engaging portion is slidably engaged with the corresponding guide portion such that the armrest is supported between the first and second sidewalls and slidable in the moving direction of the vehicle,
wherein the guide portions ascend frontward so that the armrest ascends as the armrest moves frontward.

13. The console box according to claim 12, wherein the box main body has an opening, wherein the armrest slides between a closing position for closing the opening and an opening position for opening the opening, thereby functioning as a lid for selectively opening and closing the opening.

14. The console box according to claim 12, wherein the guide portions are grooves, and the engaging portions are projections.

15. The console box according to claim 12, wherein the engaging portion are one of a plurality of engaging portions provided on the first surface and one of a plurality of engaging portions provided on the second surface.

16. A console box mounted on a vehicle, comprising:
a box main body:
first and second sidewalls that are arranged in a lateral direction of the vehicle and face each other, wherein the box main body is located between the first and second sidewalls, wherein each of the first and second sidewalls has a guide portion extending in a moving direction of the vehicle, and wherein the guide portions are formed in facing surfaces of the first and second sidewalls; and
an armrest that is located above the box main body and between the first and second sidewalls, wherein the armrest has a first surface facing the first sidewall and a second surface facing the second sidewall, wherein an engaging portion is provided on each of the first and second surfaces, and each engaging portion is slidably engaged with the corresponding guide portion such that the armrest is supported between the first and second sidewalls and slidable in the moving direction of the vehicle,
wherein the box main body has an opening, wherein the armrest slides between a closing position for closing the opening and an opening position for opening the opening, thereby functioning as a lid for selectively opening and closing the opening, wherein the armrest can be moved from the opening position to a retreat position, at which the armrest is generally off a position above the box main body, wherein each of the first and second sidewalls has an auxiliary guide portion that branches from the corresponding guide portion, wherein each engaging portion is selectively engaged with the corresponding guide portion and the corresponding auxiliary guide portion, which branches from the guide portion, and wherein, when each engaging portion is engaged with the corresponding auxiliary guide portion, the armrest is upright and at the retreat position.

17. The console box according to claim 16, wherein the armrest slides frontward, thereby moving toward the closing position, and slides rearward, thereby moving toward the opening position.

18. The console box according to claim 16, wherein the guide portions are grooves, and the engaging portions are projections.

19. The console box according to claim 16, wherein the engaging portions are one of a plurality of engaging portions provided on the first surface and one of a plurality of engaging portions provided on the second surface.

20. A console box mounted on a vehicle, comprising:
a box main body:
first and second sidewalls that are arranged in a lateral direction of the vehicle and face each other, wherein the box main body is located between the first and second sidewalls, wherein each of the first and second sidewalls has a guide portion extending in a moving direction of the vehicle, and wherein the guide portions are formed in facing surfaces of the first and second sidewalls; and
an armrest that is located above the box main body and between the first and second sidewalls, wherein the armrest has a first surface facing the first sidewall and a second surface facing the second sidewall, wherein an engaging portion is provided on each of the first and second surfaces, and each engaging portion is slidably engaged with the corresponding guide portion such that the armrest is supported between the first and second sidewalls and slidable in the moving direction of the vehicle,
wherein a rear end part of each guide portion extends arcuately.

21. The console box according to claim 20, wherein the box main body has an opening, wherein the armrest slides between a closing position for closing the opening and an opening position for opening the opening, thereby functioning as a lid for selectively opening and closing the opening.

* * * * *